United States Patent

Nohira et al.

[11] Patent Number: 5,720,898
[45] Date of Patent: Feb. 24, 1998

[54] MESOMORPHIC COMPOUND, LIQUID CRYSTAL COMPOSITION AND LIQUID CRYSTAL DEVICE

[75] Inventors: Hiroyuki Nohira, 51-5 Ohkuboryoke, Urawa-shi, Saitama-ken; Yuuta Kumano, Kawagoe; Kazuharu Katagiri, Tami; Kenji Shinjo, Atsugi; Kazuo Yoshinaga, Machida, all of Japan

[73] Assignees: Canon Kabushiki Kaisha; Hiroyuki Nohira, both of Tokyo, Japan

[21] Appl. No.: 332,475

[22] Filed: Oct. 31, 1994

Related U.S. Application Data

[63] Continuation of Ser. No. 29,957, Mar. 9, 1993, abandoned, which is a continuation of Ser. No. 879,065, May 1, 1992, abandoned, which is a continuation of Ser. No. 285,430, Dec. 16, 1988, abandoned.

[30] Foreign Application Priority Data

| Dec. 18, 1987 | [JP] | Japan | 62-320582 |
| Dec. 18, 1987 | [JP] | Japan | 62-321581 |
| Dec. 13, 1988 | [JP] | Japan | 63-314569 |

[51] Int. Cl.⁶ .................. C09K 19/52; G02F 1/13
[52] U.S. Cl. .................. 252/299.01; 252/299.61; 252/299.62; 252/299.63; 252/299.64; 252/199.65; 252/199.66; 359/103; 359/104
[58] Field of Search ............... 252/299.01, 299.61, 252/299.62, 299.63, 299.64, 299.65, 299.66; 359/103, 104

[56] References Cited

U.S. PATENT DOCUMENTS

| 4,293,435 | 10/1981 | Portugall et al. | 252/299.01 |
| 4,367,924 | 1/1983 | Clark et al. | 350/334 |
| 4,386,174 | 5/1983 | Cogswell et al. | 524/27 |
| 4,438,236 | 3/1984 | Cogswell et al. | 525/165 |

(List continued on next page.)

FOREIGN PATENT DOCUMENTS

| 0292244 | 11/1988 | European Pat. Off. . | |
| 3621581 | 1/1988 | Germany | 252/299.01 |

OTHER PUBLICATIONS

"Chiral Thermotropic Liquid Crystal Polymers" Chielisi et al. pp. 15–56 in Recent Advances in Liq. Crystal Polymers Edit by chapay, 1983.
Sigaud, G. et al Macromolecules 20, 578, 1987.
Chung, T–S. Polym. Eng. and Sci. 26(13) 906 1986.
Griffin, A.C. et al. Liq. Cryst. 4(6) 677, 1989.
Molecular Crystals & Liquid Crystals, vol. 157 (Apr. 1988) 57–67.
Polymer Buletin, vol. 12, No. 5 (Nov. 1984) 384.
Patent Abstracts of Japan, vol. 10, No. 330 (Nov. 1986) (P-514).

Primary Examiner—Shean C. Wu
Attorney, Agent, or Firm—Fitzpatrick, Cella, Harper & Scinto

[57] ABSTRACT

A liquid crystal composition, comprising a main chain-type mesomorphic polymer and a mesomorphic monomer and showing a smectic phase including a plurality of molecular layers, wherein a linkage of a covalent bond is present between adjacent molecular layers among the plurality molecular layers. Because of the presence of the covalent bond linkage between the molecular layers, the elastic energy of the liquid crystal per se relating to the elastic energy between the smectic liquid crystal molecular layers can be controlled to provide a uniform alignment. The mesomorphic polymer preferably has a structure represented by the following formula (1):

$$A\text{--}(\text{--}(B)_x\text{--}M\text{--}(B)_x\text{--}F)_y\text{--}(B)_x\text{--}M\text{--}(B)_x\text{--}A, \tag{1}$$

wherein A denotes a terminal flexible chain group, M denotes a mesogen group, F denotes a spacer flexible chain group, x is 0 or 1, B denotes an ester bond group, ether bond group, thioester bond group, dimethylsiloxane bond group or thioether bond group, and y is 1–200.

21 Claims, 2 Drawing Sheets

U.S. PATENT DOCUMENTS

| | | | |
|---|---|---|---|
| 4,561,726 | 12/1985 | Goodby et al. | 350/341 |
| 4,721,367 | 1/1988 | Yoshinaga et al. | 350/350 S |
| 4,775,223 | 10/1988 | Yoshinaga et al. | 350/333 |
| 4,798,680 | 1/1989 | Nohira et al. | 252/299.01 |
| 4,812,259 | 3/1989 | Yoshinaga et al. | 252/299.65 |
| 4,816,178 | 3/1989 | Katagiri et al. | 252/299.6 |
| 4,842,754 | 6/1989 | Hakemi et al. | 252/299.01 |
| 4,915,867 | 4/1990 | Morita et al. | 252/299.5 |
| 5,384,069 | 1/1995 | Yoshinaga et al. | 252/299.01 |

MESOMORPHIC COMPOUND, LIQUID CRYSTAL COMPOSITION AND LIQUID CRYSTAL DEVICE

This application is a continuation of application Ser. No. 08/029,957, filed Mar. 9, 1993, now abandoned, which is, in turn, a continuation of application Ser. No. 07/879,065, filed May 1, 1992, now abandoned, which is, in turn, a continuation of application Ser. No. 07/285,430, filed Dec. 16, 1988, now abandoned.

FIELD OF THE INVENTION AND RELATED ART

The present invention relates to a liquid crystal composition and a liquid crystal device containing the composition, particularly a liquid crystal composition and a liquid crystal device wherein the alignment and physical property of a liquid crystal having a layer structure, such as smectic liquid crystal, have been controlled. The present invention further relates to a novel mesomorphic compound, a process for producing the same and a liquid crystal composition containing the same capable of forming a liquid crystal layer suitable for such a liquid crystal device.

There has been a well known type of liquid crystal devices using TN (twisted nematic) type liquid crystals as shown, for example, in "Voltage-Dependent Optical Activity of a Twisted Nematic Liquid Crystal" by M. Schadt and W. Helfrich, Applied Physics Letters, Vol. 18, No. 4 (Feb. 15, 1971), pp. 127–128. In this type of liquid crystal device, the number of picture elements have been restricted because there is a problem that a crosstalk phenomenon occurs when a device of a matrix electrode structure with a high density of picture elements is driven according to a multiplexing driving scheme. Further, their uses for display have been limited because of slow electric field response and poor visual angle characteristics.

As another type of liquid crystal device, there has been known one comprising a plurality of picture elements each connected to and subject to switching by a thin film transistor as a switching element. This type of liquid crystal device, however, is accompanied with problems such that production of thin film transistors on a substrate is very complicated, and production of a display device with a large picture area or screen is difficult.

In order to obviate the above-mentioned drawbacks of the conventional types of liquid crystal devices, Clark and Lagerwall have proposed the use of a liquid crystal device wherein a ferroelectric liquid crystal is disposed in a thin layer having a thickness less than 5 times that of the spiral pitch thereof so that its spiral structure is unwound to develop a bistability (e.g., U.S. Pat. No. 4,367,924). As the bistable liquid crystal, a ferroelectric liquid crystal showing a chiral smectic C phase (SmC*) or H phase (SmC*) is generally used.

Such a ferroelectric liquid crystal (FLC) has very rapid response speed on account of having spontaneous polarization, can also exhibit memorizable bistable state and further have excellent vision angle characteristics, and therefore it is suitable for a display of large capacity and large picture area. However, in actual production of a liquid crystal device, it is difficult to form a monodomain over a wide area, so that there is an accompanying with a technical problem in producing a large area of display device.

In order to solve such a problem, it has been proposed to form a monodomain of a ferroelectric smectic liquid crystal using an epitaxial technique and an interfacial energy (U.S. Pat. No. 4,561,726). A monodomain obtained in this way is not essentially stable but can be readily converted into multiple domains when subjected to pressure or thermal stimulation.

Specific examples of alignment control for ferroelectric liquid crystal devices may include a method of forming a film of $SiO_2$ or a polymer such as polyimide or polyvinyl alcohol on a substrate constituting a liquid crystal cell and rubbing the film with a cloth, etc., in one direction. Moreover, a similar effect has been obtained by oblique vapor deposition of SiO and other oxides, fluorides or metals such as Au and Al. An epitaxial alignment utilizing an interfacial energy may also be effected by a surface treatment with a stretched polymer film, grating, etc.

As a mechanical treatment method, it has been also reported to fill a container having substrates at a small gap with a liquid crystal and relatively sliding the substrates to apply a shearing force for alignment. It has been also reported to align a liquid crystal by application of an external field, such as a magnetic field, electric field or electromagnetic field due to light.

In a so-called surface-stabilized FLC (SSFLC) device utilizing an alignment control method as described above, bistability of a liquid crystal is developed on an equilibrium between the elastic energy of the liquid crystal per se and the surface energy given by the liquid crystal alignment. For this reason, not only a display quality such as contrast but also characteristics such as response speed, response threshold and memory characteristic are changed depending on the alignment.

In conventional devices, the alignment control of a ferroelectric liquid crystal has been accomplished only by the interfacial control using an alignment film or by application of an external field such as electric field, magnetic field or shearing. In order to apply the alignment control by an alignment film in an SSFLC device, a strong alignment force is required for initial alignment of a smectic phase while a weak alignment force is required for bistability and memory characteristic during driving under an electric field. This has not been fully satisfied as yet. On the other hand, the application of an external field requires persistent maintenance of the external field which is difficult while the release of the field leads to loss of the alignment force. For example, an alignment obtained by AC application in the course of cooling provides a relatively good alignment state but the removal of the AC causes restoration of an original helical structure, twist structure or monostable structure.

The above problems have been essentially caused by the absence of appropriate methods for controlling inherent liquid crystal properties, such as an elastic constant of SmC* helical structure, elastic constant of twisted structure, elastic constant of bending, and elastic constant of splay structure. Further, there is no interaction between smectic layers in SmA phase or SmC phase, and each liquid crystal molecule has an arbitrary center of gravity between the layers. As a result, in the case where each smectic layer is subjected to a transition like that of Goldstone's mode as in an SSFLC device, the absence of interaction between layers results in an unclear threshold value and instabilization of memory states.

SUMMARY OF THE INVENTION

According to an aspect of the present invention, there is provided a liquid crystal composition, comprising a main chain-type mesomorphic polymer and a mesomorphic monomer and showing a smectic phase including a plurality of molecular layers each including a plurality of liquid crystal molecules, wherein a linkage of a covalent bond is present between adjacent molecular layers among the plurality of molecular layers.

According to another aspect of the present invention, there is provided a liquid crystal device which comprises the liquid crystal composition between a pair of substrates.

Herein, the term "mesomorphic polymer" refers to a mesomorphic compound having a terminal flexible chain, a plurality of mesogen units or groups and a spacer flexible chain connecting an adjacent pair of the mesogen groups. The number of mesogen units connected by the spacer flexible chain represents the number of recurring units in the mesomorphic polymer. On the other hand, the term "mesomorphic monomer" refers to a mesomorphic compound having a terminal flexible chain and a mesogen unit or group and having no spacer flexible chain connecting mesogen units.

In the above composition and device, the above-mentioned linkage of a covalent bond between adjacent molecular layers is given by the above-mentioned main-chain type mesomorphic polymer which comprises a mesogen group or unit and a flexible chain. The mesogen group of the mesomorphic polymer may preferably have a gravity center substantially corresponding to that of the mesomorphic monomer constituting the same smectic molecular layer along the extension of the smectic molecular layer. Further, the flexible chain may preferably not have a bend providing a hairpin structure.

According to the present invention, smectic molecular layers composed of liquid crystal molecular layers are linked by covalent bonds, so that not only the control of the surface energy but also the control of the elastic energy of the liquid crystal per se, particularly the control of the interaction between the smectic molecular layers, become possible. As a result, a uniformly good alignment can be attained, and the control of the switching characteristic of an SSFLC device becomes possible.

More specifically, as described in Ferroelectrics, 53, pp. 71–80 (1984) by M. Glogarova, et al, the disappearance of helices and development of bistability are governed principally by the relationship between the elastic constant of helices of a smectic liquid crystal and the surface energy. According to the present invention, the control of the elastic constant of helices between smectic molecular layers has now become possible by providing a linkage of a covalent bond between smectic molecular layers. As a result, it has become possible to develop bistability even in a cell having a thickness which is substantially larger than the helical pitch. Further, it has become possible to realize a uniform alignment providing a good contrast and thus solve a problem of a lowering in contrast caused by development of a twist structure in a smectic molecular layer.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
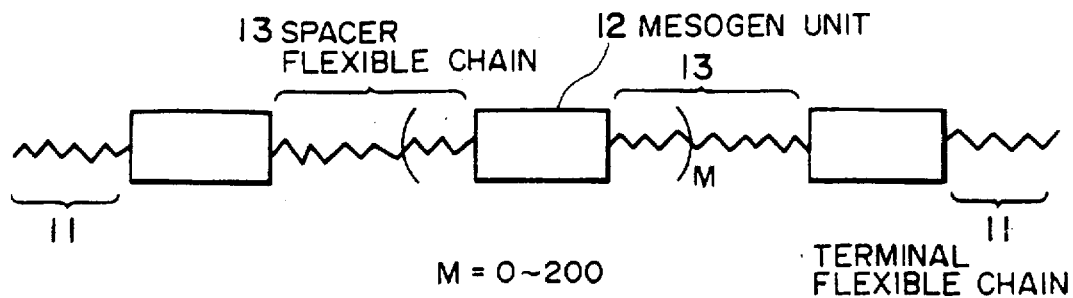
FIG. 1 is a schematic view for illustrating a structure of a mesomorphic polymer.
Figure 2:
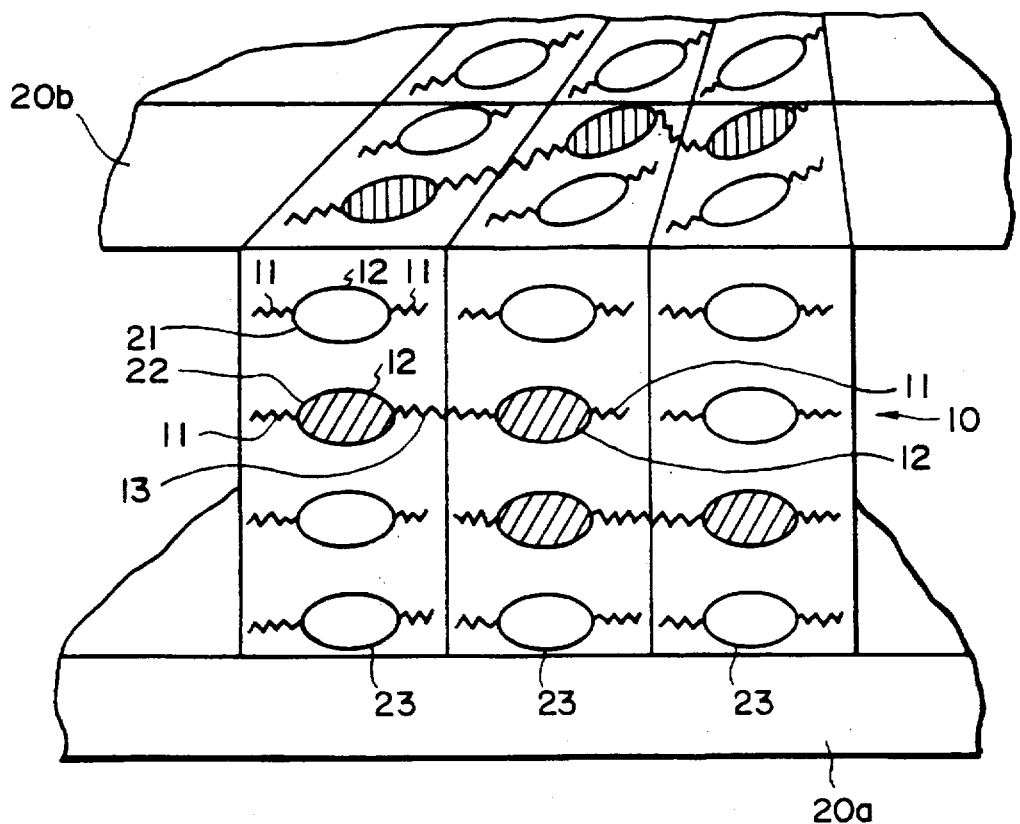
FIG. 2 is a partial schematic perspective view of a liquid crystal device according to the present invention.

FIG. 1 illustrates a molecular structure of a mesomorphic polymer used in the present invention, which comprises a mesogen unit or group 12, a terminal flexible chain 11, and a spacer flexible chain 13. FIG. 2 is a partial schematic perspective view of a liquid crystal device according to the present invention, which comprises a liquid crystal layer 10 disposed between a pair of substrates 20a and 20b of, e.g., glass or plastic. The liquid crystal layer 10 comprises a plurality of smectic molecular layers 23 each comprising a plurality of molecules including those of a mesomorphic monomer 21 and a mesomorphic polymer 22. Each mesomorphic polymer 22 has a mesogen unit 12, a terminal flexible chain 11 and a spacer flexible chain 13 as described above and generally extends over a plurality of the smectic molecular layers with a linkage composed of the spacer flexible chain 13 present between adjacent molecular layers 23. The smectic molecular layers 23 are disposed vertical or inclined with respect to the substrates 20a and 20b so as to form a single normal thereto.

In order to realize a uniform alignment as described above, it is preferred to apply a uniaxial orientation treatment to both or one of the substrates 20a and 20b.

Figure 3A:
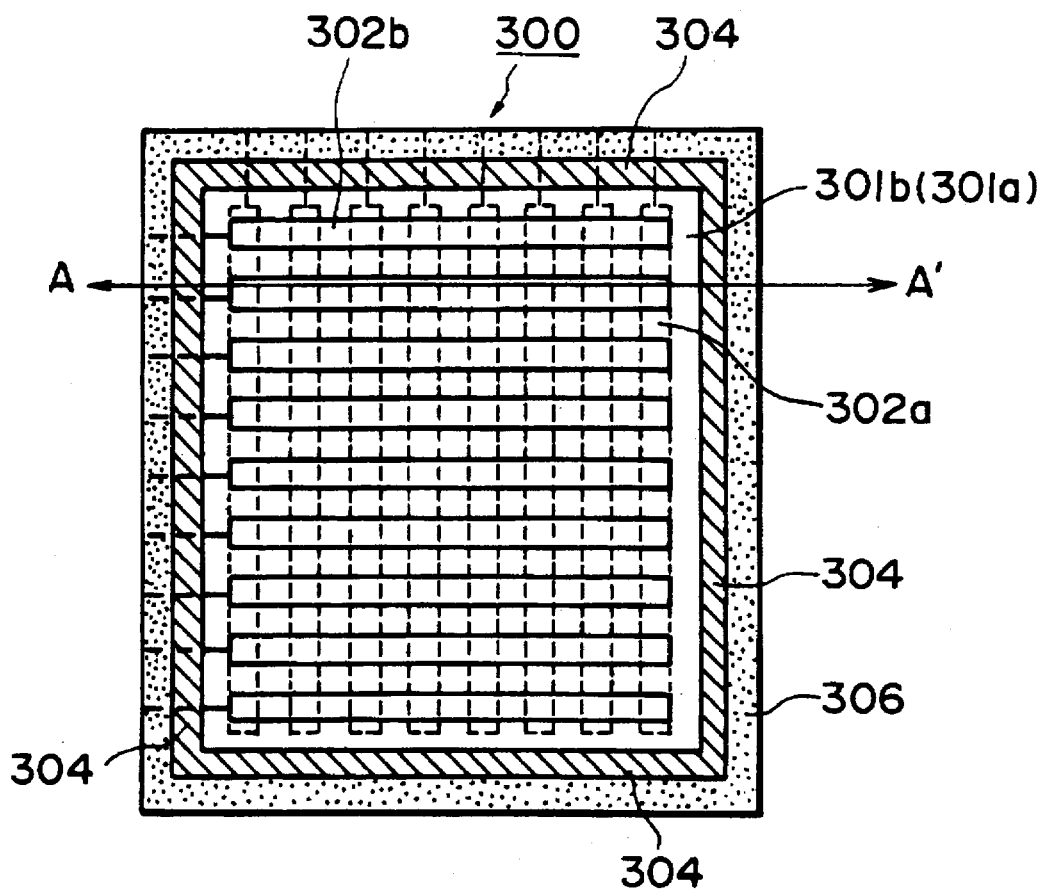
FIG. 3A is a plan view of a liquid crystal device according to the present invention.
Figure 3B:
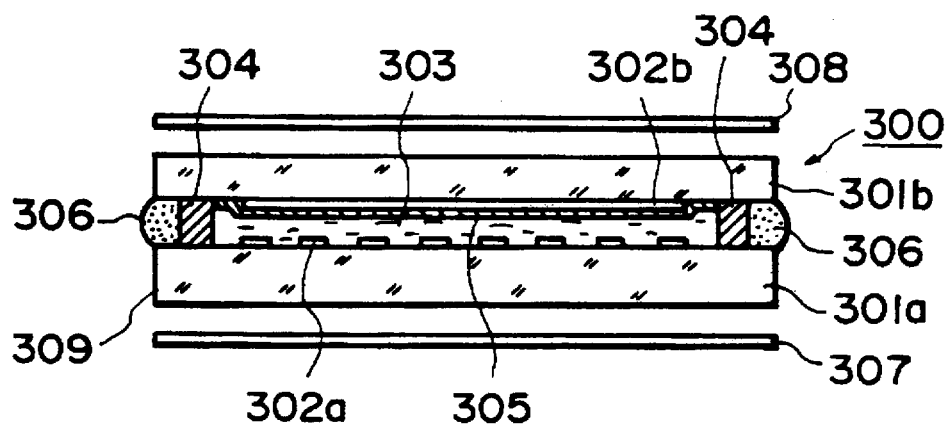
FIG. 3B is a sectional view taken along the line A–A' in FIG. 3A.

FIGS. 3A and 3B illustrate an embodiment of the liquid crystal device according to the present invention. FIG. 3A is a plan view of the embodiment and FIG. 3B is a sectional view taken along the line A–A' in FIG. 3A.

A cell structure 300 shown in FIGS. 3A and 3B comprises a pair of substrates 301a and 301b made of glass plates or plastic plates which are held with a predetermined gap with spacers 304 and sealed with an adhesive 306 to form a cell structure. On the substrate 301a is further formed an electrode group (e.g., an electrode group for applying scanning voltages of a matrix electrode structure) comprising a plurality of transparent electrodes 302a in a predetermined pattern, e.g., of a stripe pattern. On the substrate 301b is formed another electrode group (e.g., an electrode group for applying signal voltages of the matrix electrode structure) comprising a plurality of transparent electrodes 302b intersecting with the transparent electrodes 302a.

On the substrate 301b provided with such transparent electrodes 302b may be further formed, as desired, an alignment control film 305 composed on an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin.

The alignment control film 305 may be formed by first forming a film of an inorganic insulating material or an organic insulating material as described above and then rubbing the surface thereof in one direction with velvet, cloth, paper, etc.

Alternatively, the alignment control film 305 may be formed as a film of an inorganic insulating material such as SiO or $SiO_2$ on the substrate 301b by the oblique or tilt vapor deposition.

In another embodiment, the surface of the substrate 301b of glass or plastic per se or a film of the above-mentioned inorganic material or organic material formed on the substrate 301b is subjected to oblique etching to provide the surface with an alignment control effect.

It is preferred that the alignment control film 305 also functions as an insulating film. For this purpose, the alignment control film may preferably have a thickness in the range of 100 Å to 1 micron, especially 500 to 5000 Å. The insulating film also has a function of preventing the occurrence of an electric current which is generally caused due to minor quantities of impurities contained in the liquid crystal layer 303, whereby deterioration of the liquid crystal compounds is prevented even on repeated operations.

In the device of the present invention, it is possible to provide an alignment control film similar to the one denoted by 305 as described above also on the other substrate 301.

The device shown in FIG. 3A and 3B further comprises polarizers 307 and 308 having polarizing axes crossing each other, preferably at 90 degrees.

Referring again to FIG. 2, in order to provide a linkage for causing an interaction between adjacent smectic molecular layers 23, a mesomorphic polymer is required to have a molecular structure as shown in FIG. 1 including a mesogen group having a good affinity with the smectic molecular layers 23 and a flexible chain linking the layers 23 with a covalent bond to control the interaction between the smectic molecular layers 23.

A mesomorphic polymer as shown in FIG. 1 may preferably have a structure represented by the following formula (1):

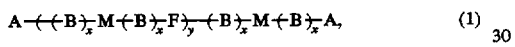

(1)

wherein A denotes a terminal flexible chain group, M denotes a mesogen group, F denotes a spacer flexible chain group, x is 0 or 1, B denotes an ester bond group, ether bond group, thioester bond group, dimethylsiloxane bond group or thioether bond group, and y is 1–200.

The mesogen group for providing a good affinity with a smectic molecular layer 23 may for example be selected depending on another component such as a mesomorphic monomer constituting the smectic molecular layer from those having structures as shown below.

Mesogen group 12

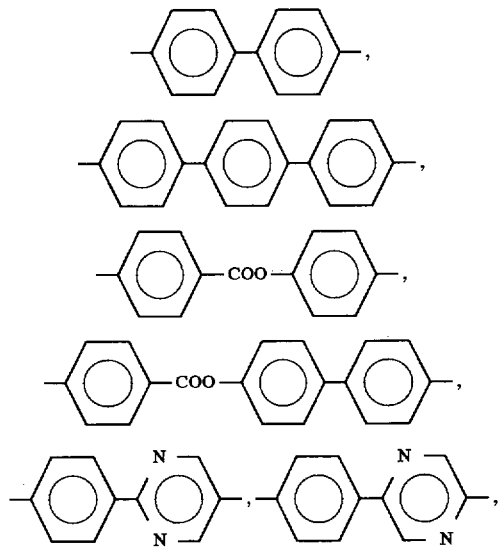

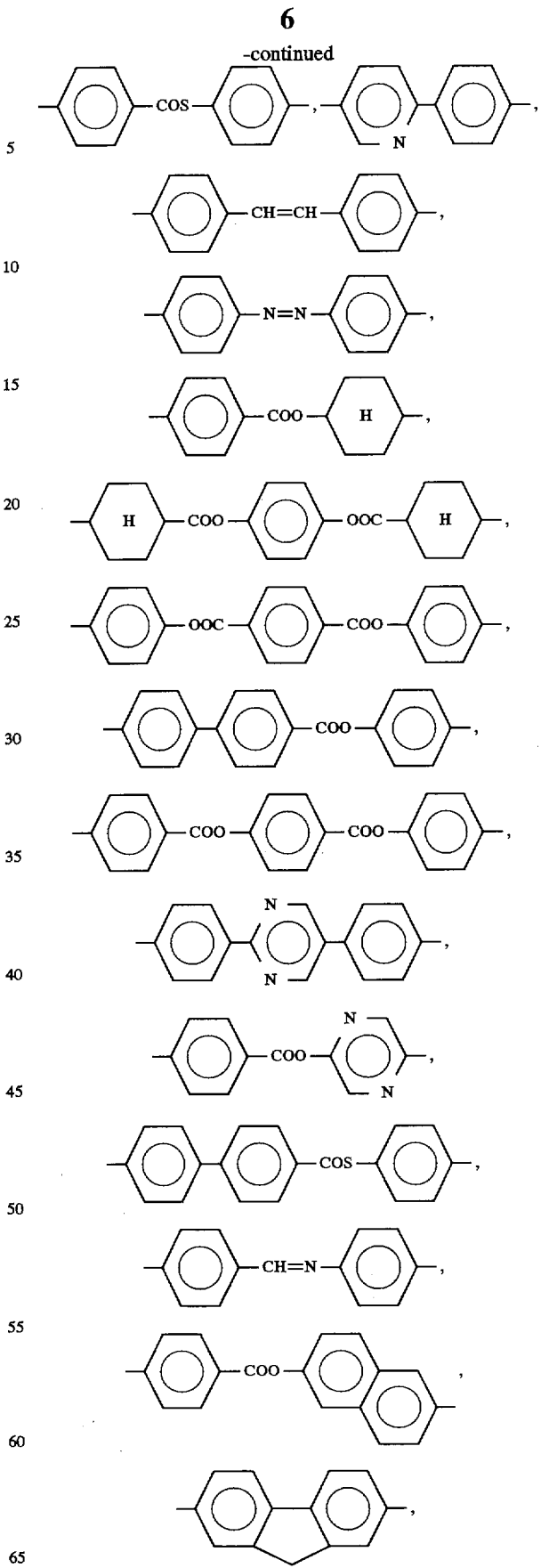

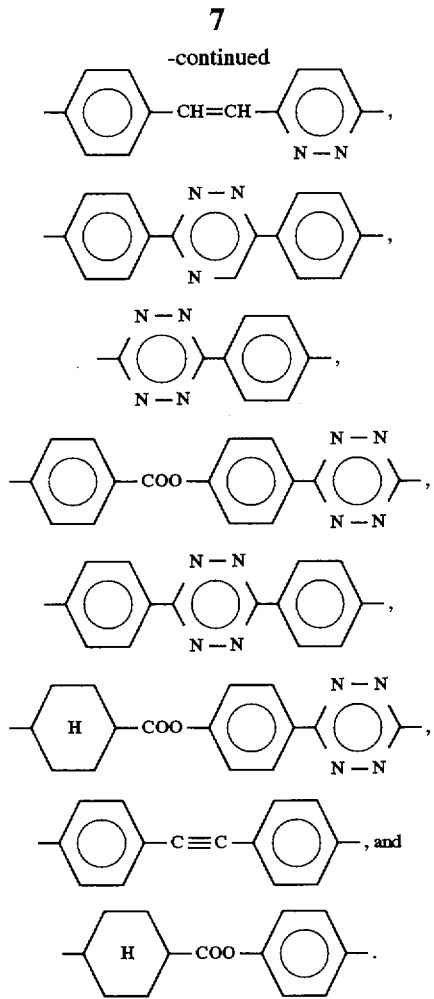

The above examples of mesogen groups may be used singly or in combination. The mesogen groups can have a substituent, such as cyano group, halogen radical, methoxy group, trifluoromethyl group or methyl group in order to control the affinity.

The terminal flexible chain 11 and spacer flexible chain 13 may be selected to have an appropriate length depending on the thickness or pitch of the smectic molecular layers 23. The interaction between the smectic molecular layers can be controlled depending on the degree of freedom of the flexible chain. Examples of the terminal flexible chain group 11 and the spacer flexible chain group 13 may include those respectively shown below. These examples can be used in plural species so as to provide an improved controllability.

Terminal flexible chain 11

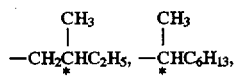

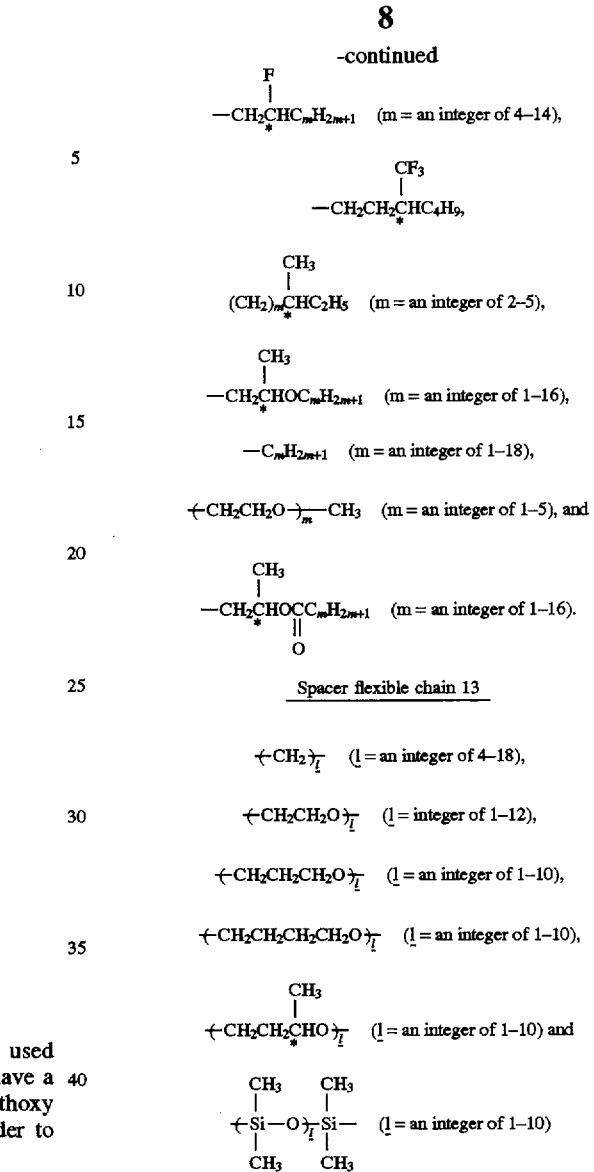

The terminal flexible chain 11 or spacer flexible chain 13 may preferably have an optically active group which may further preferably provide a spontaneous polarization $P_S$ having a polarity (positive or negative) coinciding with that shown in SmC* (chiral smectic C) phase of the resultant liquid crystal composition. These considerations provide a better interaction between smectic molecular layers 23 free of decrease in $P_S$ or bistability.

Examples of mesomorphic polymers 22 comprising a mesogen group 12, a terminal flexible chain 11 and a spacer flexible chain 13 and suitable for providing a linkage of a covalent bond between smectic molecular layers 23 for controlling the interaction therebetween may include those represented by the following formulas.

Mesomorphic polymer 22
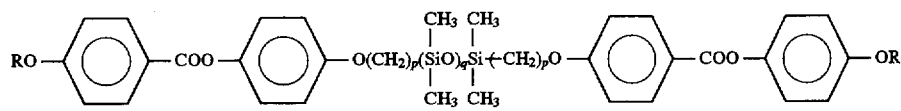
[R = (CH$_2$)$_t$CH$_3$]  t = 1–18,  q = 1–10,  p = 1–18
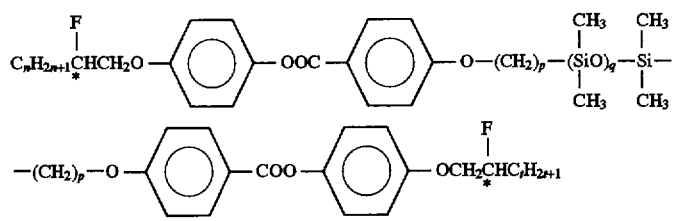
(t = 4–14,  p = 1–12,  q = 1–5)
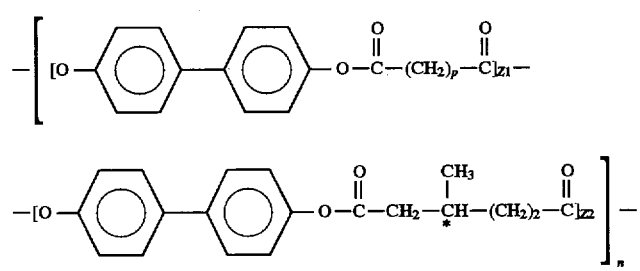
(p = 2–15, Z1 + Z2 = 1)
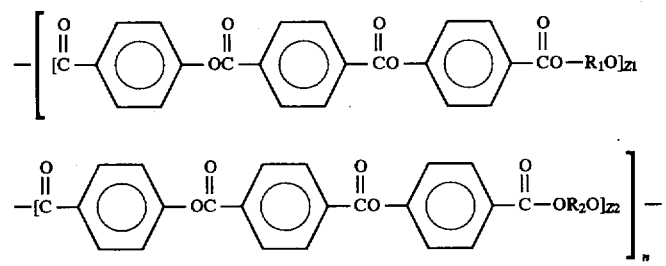
$R_1 = -CH_2CH_2\overset{*}{C}H-(CH_2)_3-$,  $R_2 = -(CH_2)_p-$
(Z1 + Z2 = 1, p = 2–15)
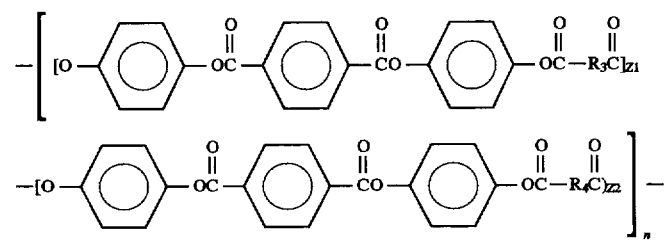
$R_3 = -CH_2\overset{*}{C}H-(CH_2)_2-$,  $R_4 = -(CH_2)_p-$
(Z1 + Z2 = 1,  p = 2–15)

-continued
Mesomorphic polymer 22
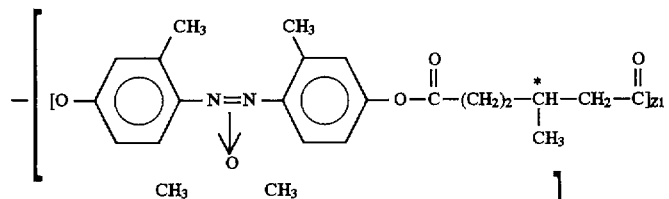
$(Z1 + Z2 = 1, \quad p = 2-15)$
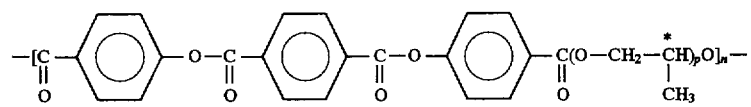
$(p = 1-5)$
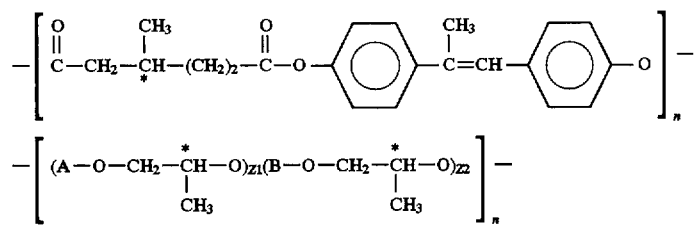
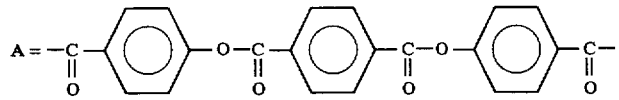
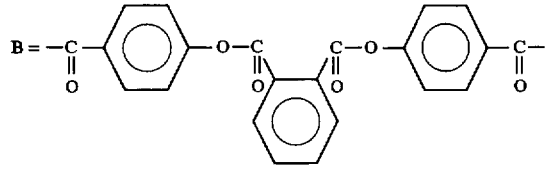
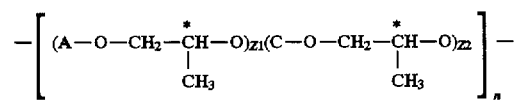
$(Z1 + Z2 = 1)$
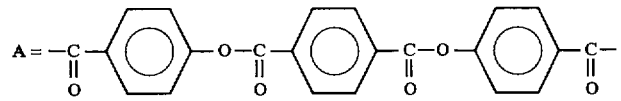
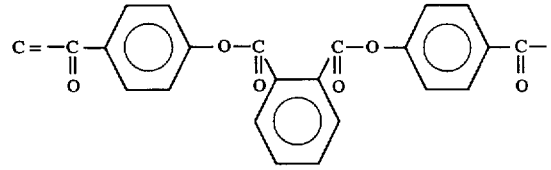
$(Z1 + Z2 = 1)$ -continued Mesomorphic polymer 22

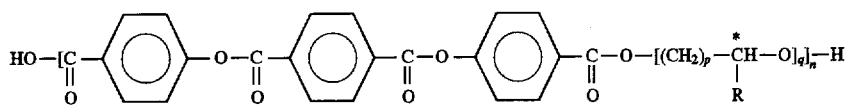

(p = 1–3, q = 1–20)

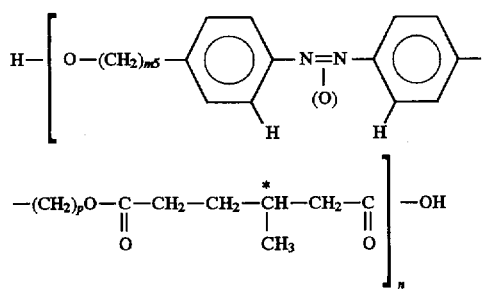

(p = 0–5)

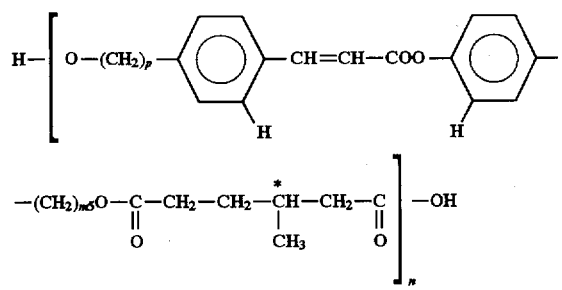

(p = 0–5)

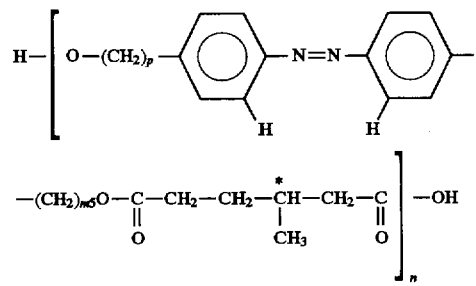

(p = 0–5)

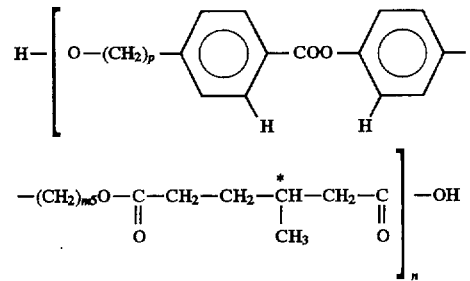

(p = 0–5)

(In the above formulas, p and p are respectively an integer, n is an integer of 1–200 and m5 is an integer or 1–18).

In a composition containing a mesomorphic polymer as described above for providing an interaction between smectic molecular layers 23, it is not preferred that the flexible chain causes a bend to provide a hairpin structure in order that each mesogen group 12 shows an affinity with the layer 23 and adjacent layers are reliably linked by a covalent bond. In the case where the mesomorphic polymer used is a dimer, a liquid crystal layer free of a bend or hairpin structure is given by selecting the spacer flexible chain so that it coincides with a boundary between the smectic molecular layers and the gravity center of a mesogen group thereof aligns with that of the mesogen group of a mesomorphic monomer in a smectic molecular layer along the extension of the smectic molecular layer.

Including the cases of dimer, trimer or larger mesomorphic polymers, the spacer flexible chain may preferably have a length of 5–100 Å, particularly 6–60 Å. A length less than 5 Å is not preferred because of difficulty in forming a smectic molecular layer. A length in excess of 100 Å is not preferred because it causes a slow response speed.

If the mesomorphic polymer used in a trimer or larger, i.e., one having three or more recurring units, a bend or hairpin structure is liable to be formed, it is preferred to effect a re-aligning treatment for reliable molecular alignment as by stretching, such as uniaxial stretching, biaxial stretching or inflation stretching, or shearing. If the liquid crystal composition lacks a film-formability and is difficult to stretch, the composition may be sandwiched between films to provide a laminate which is then co-stretched to provide a desired alignment.

As described above, the liquid crystal device of the present invention comprises a pair of substrates, and a layer of a liquid crystal composition disposed between the substrates and showing a smectic phase, which comprises a plurality of smectic molecular layers and includes a linkage of a covalent bond between adjacent smectic molecular layers. In a preferred embodiment, the mesomorphic polymer comprises a mesomorphic dimer.

Another preferred embodiment may be prepared by once stretching a liquid crystal layer comprising a main chain-type mesomorphic polymer having three or more recurring units, preferably five or more recurring units, and a mesomorphic monomer, and disposing the stretched liquid crystal layer between a pair of substrates as shown in FIGS. 3A and 3B.

The liquid crystal composition of the present invention may preferably contain 1 wt. % or more, particularly 5 wt. % or more, of such a mesomorphic polymer. A mesomorphic polymer having a low molecular weight and a small number of recurring units should be contained in a larger quantity for providing a reliable linkage between smectic layers, while a mesomorphic polymer having a high molecular weight and a large number of recurring units can provide such a linkage at a smaller quantity. The upper limit of the mesomorphic polymer content in the composition may preferably be 90 wt. %, particularly 85.

It is preferred that at least one of the mesomorphic polymer and mesomorphic monomer has an optically active group and is one showing chiral smectic phase. Therefore, if the mesomorphic polymer has an optically active group, it is not required that the mesomorphic monomer also has an optically active group.

Examples of the mesomorphic monomer usable in the present invention may include those enumerated hereinbelow:

Mesomorphic monomer 21

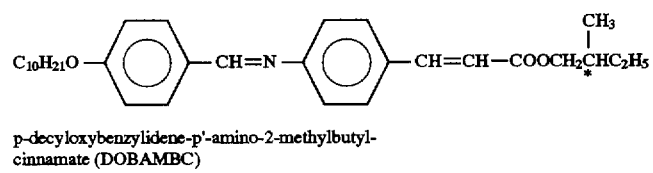

p-decyloxybenzylidene-p'-amino-2-methylbutyl-cinnamate (DOBAMBC)

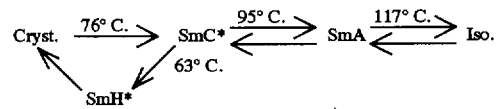

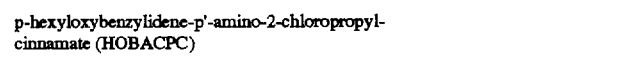

p-hexyloxybenzylidene-p'-amino-2-chloropropyl-cinnamate (HOBACPC)

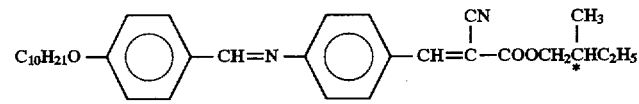

p-decyloxybenzylidene-p'-amino-2-methylbutyl-α-cyanocinnamate (DOBAMBCC)

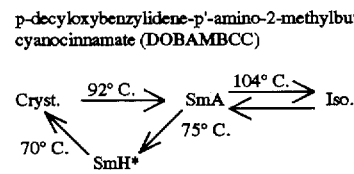

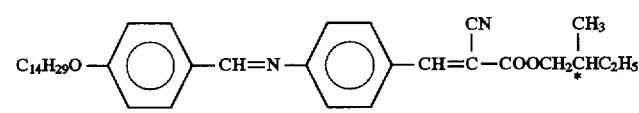

-continued
Mesomorphic monomer 21 p-tetradecyloxybenzylidene-p'-amino-2-methylbutyl-
α-cyanocinnamate (TDOBAMBCC)

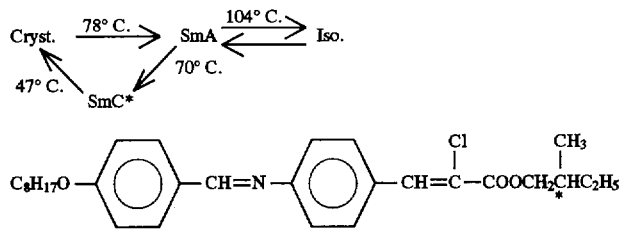

p-octyloxybenzylidene-p'-amino-2-methylbutyl-
α-chlorocinnamate (OOBAMBCC)

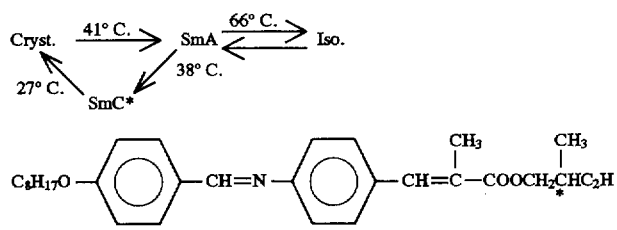

p-octyloxybenzylidene-p'-amino-2-methylbutyl-
α-methylcinnamate

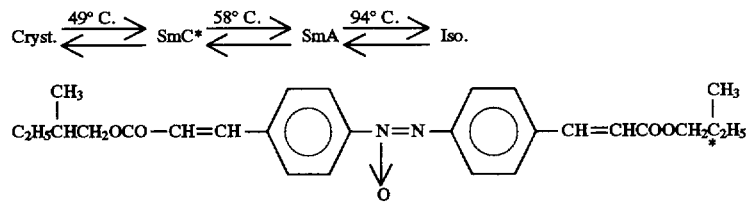

4,4'-azoxycinnamic acid-bis(2-methylbutyl)ester

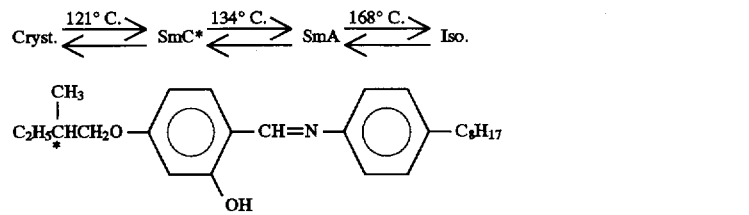

4-O-(2-methylbutyl)resorcylidene-4'-octylaniline (MBRA 8)

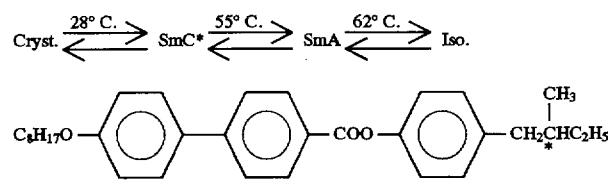

4-(2'-methylbutyl)phenyl-4'-octyloxybiphenyl-4-carboxylate

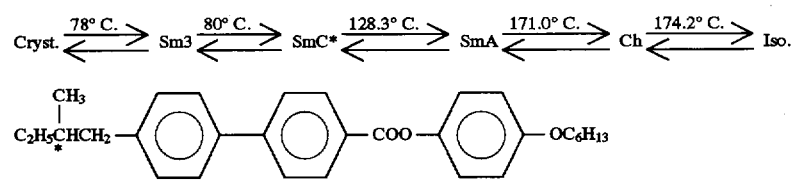

4-hexyloxyphenyl-4-(2''-methylbutyl)biphenyl-4'-carboxylate

-continued
Mesomorphic monomer 21
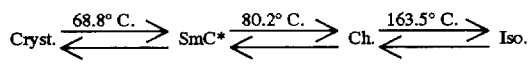
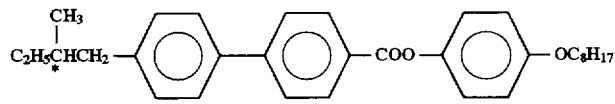
4-octyloxyphenyl-4-(2''-methylbutyl)biphenyl-4'-carboxylate
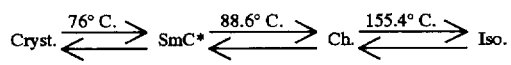
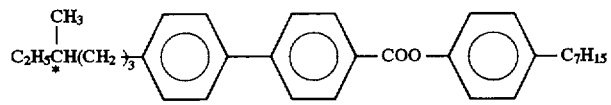
4-heptylphenyl-4-(2''-methylbutyl)biphenyl-4'-carboxylate
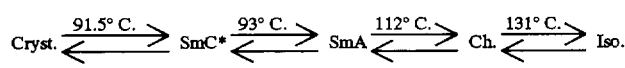
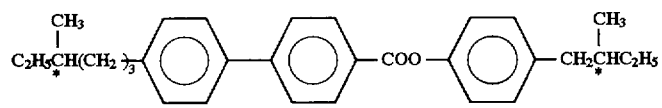
4-(2''-methylbutyl)phenyl-4-(4''-methylhexyl)-biphenyl-4'-carboxylate
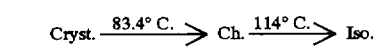
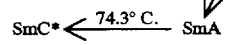
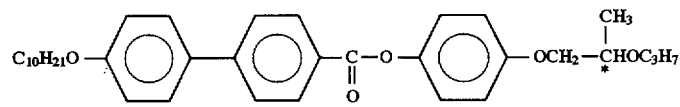
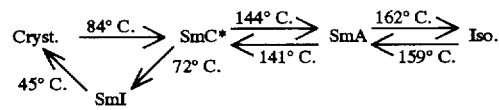
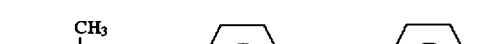
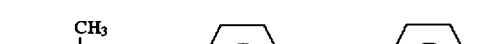
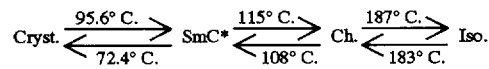
a = 6, b = 12
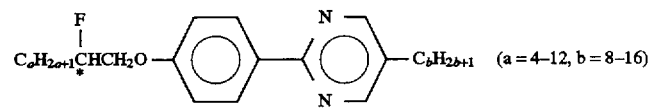
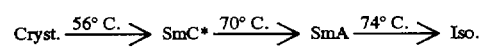
a = 8, b = 10
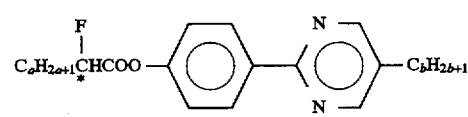

-continued

Mesomorphic monomer 21

Cryst. $\xleftarrow{33° C.}$ SmC* $\xleftarrow{43° C.}$ SmA $\xleftarrow{46° C.}$ Ch. $\xleftarrow{48° C.}$ Iso.

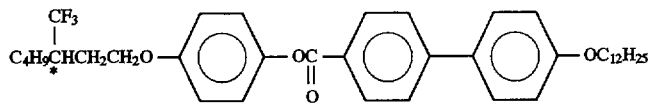

Cryst. $\xrightarrow{58° C.}$ SmC* $\xrightarrow{120° C.}$ SmA $\xrightarrow{146° C.}$ Iso.

Herein, the symbols used for describing phase-transition respectively denote the following phases.

Cryst.: crystal phase,
SmA: smectic A phase,
SmC*: chiral smectic phase,
N: nematic phase,
Ch.: cholesteric phase,
Iso.: isotropic phase,
SmA: smectic A phase,
SmB: smectic B phase, and
Sm3: smectic phase (un-identified) other than SmA and SmC*.

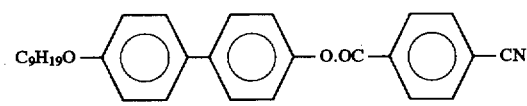

4'-n-nonyloxy-4-biphenyl-4-cyanobenzoate isotropic ⟶ nematic ⟶ smetic C

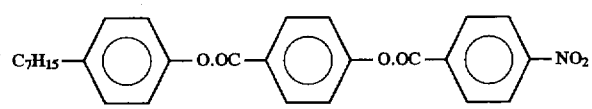

4-n-heptylphenyl-4-(4'-nitrobenzoyloxybenzoate)
(DB₇NO₂)

isotropic ⟶ nematic ⟶ smectic A

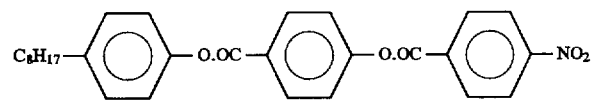

4-n-octylphenyl-4-(4'-nitrobenzoyloxy)benzoate
(DB₈NO₂)

isotropic ⟶ nematic ⟶ smectic A ⟶ smectic C

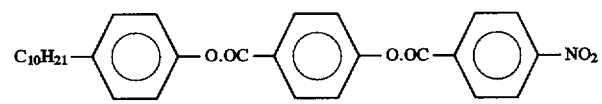

4-n-decylphenyl-4-(4'-nitrobenzoyloxy)benzoate
(DB₁₀NO₂)

isotropic ⟶ nematic ⟶ smectic A ⟶ smectic C

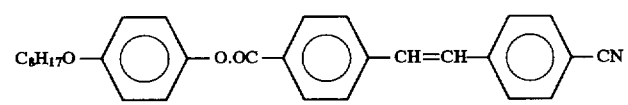

trans-4-(4"-octyloxybenzoyloxy)-4'-cyanostilbene
(T8)

isotropic ⟶ nematic ⟶ smectic A₁ ⟶ nematic ⟶ smectic A₂

-continued

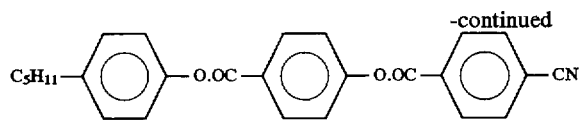

4-n-pentylphenyl-4-(4'-cyanobenzoyloxy)benzoate
(DB$_5$CN)

isotropic ⟶ nematic ⟶ smectic A

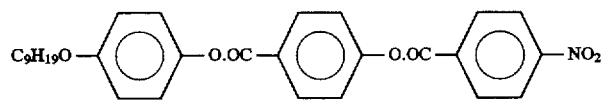

4-n-nonyloxyphenyl-4-(4'-nitrobenzoyloxy)benzoate
(DB$_9$ONO$_2$)

isotropic ⟶ nematic ⟶ smectic A ⟶ smectic C

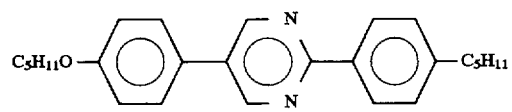

2-(4'-n-pentylphenyl)-5-(4''-n-pentyloxyphenyl)-pyrimidine isotropic ⟶ smectic A ⟶ smectic C ⟶ smectic F ⟶ smectic G

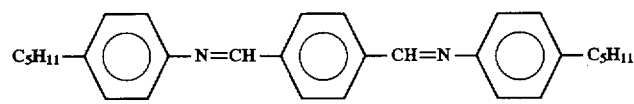

terephthalylidene-bis-4-n-pentylaniline (TBPA)

isotropic ⟶ nematic ⟶ smectic A ⟶ smectic C ⟶ smectic F ⟶ smectic G ⟶ smectic H

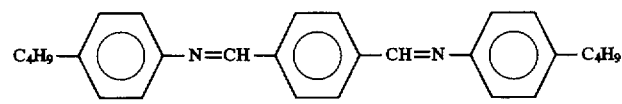

N-terephthalylidene-bis-4-n-butylaniline (TBBA)

isotropic ⟶ nematic ⟶ smectic A ⟶ smectic C ⟶ smectic G ⟶ smectic H

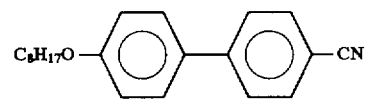

4-cyano-4'-n-octyloxybiphenyl (8OCB)

isotropic ⟶ nematic ⟶ smectic A

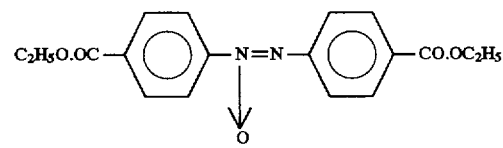

ethyl-4-azobenzoate isotropic ⟶ smectic A

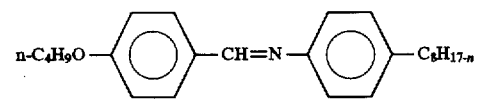

-continued

N-(4'-n-butyloxybenzylidene)-4-n-octylaniline
(40.8)

isotropic ⟶ smectic A ⟶ smectic B

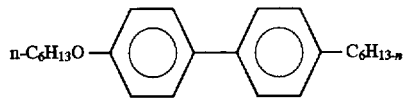

4-n-hexyl-4'-n-hexyloxybiphenyl isotropic ⟶ smectic B ⟶ smectic E

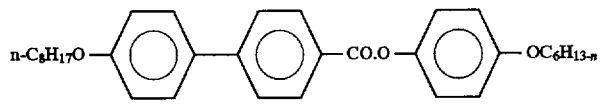

4-n-hexyloxyphenyl-4'-n-octyloxybiphenyl-4-carboxylate isotropic ⟶ nematic ⟶ smectic A ⟶ smectic C ⟶ smectic B

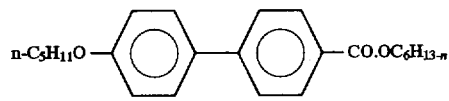

n-hexyl-4'-n-pentyloxybiphenyl-4-carboxylate
(65 OBC)

isotropic ⟶ smectic A ⟶ smectic B ⟶ smectic E

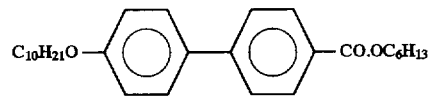

4-n-hexyl-4'-n-decyloxybiphenyl-4-carboxylate isotropic ⟶ smectic A ⟶ smectic C

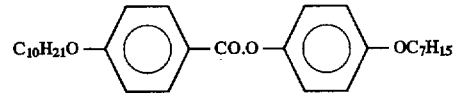

4-n-heptyloxyphenyl-4-n-decyloxybenzoate isotropic ⟶ smectic A ⟶ smectic C

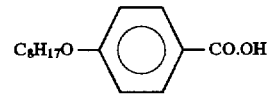

4-n-octyloxybenzoic acid isotropic ⟶ nematic ⟶ smectic C

According to the present invention, there is further provided a class of mesomorphic polymers as described above, which shows a broad SmC* phase temperature range and is represented by the following formula (2):

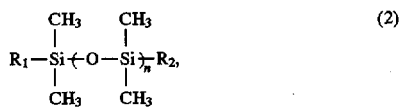

wherein n is an integer of 1–10, $R_1$ and $R_2$ respectively denote a mesomorphic residue group, and at least one of $R_1$ and $R_2$ has an optically active group.

More specifically, $R_1$ and $R_2$ may preferably be respectively one represented by the following formula (3):

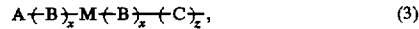

wherein M denotes a mesogen group, A denotes a terminal flexible chain group, C denotes a spacer flexible chain group, x and z are respectively 0 or 1, and B denotes an ester bond group, ether bond group, thioester bond group or thioether bond group.

Examples of the mesomorphic group M may include those enumerated above for the mesogen group of the mesomorphic polymer represented by the formula (1).

Examples of the terminal flexible chain group A and the spacer flexible chain group may include those respectively shown below. These examples can be used in plural species so as to provide an improved controllability.

Terminal flexible chain

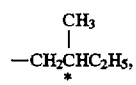

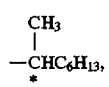

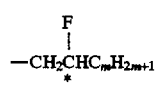

(m = an integer of 4–14),

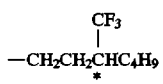

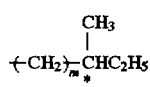

(m = an integer of 2–5),

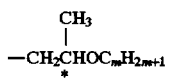

(m =0 an integer of 1–16),

(m = an integer of 1–18),

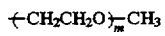

(m = an integer of 1–5),

-continued
and

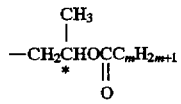

(m = an integer 1–16)

Spacer flexible chain

($\underline{1}$ = an integer of 1–18),

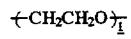

($\underline{1}$ = an integer of 1–12),

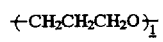

($\underline{1}$ = an integer of 1–10),

($\underline{1}$ = an integer of 1–10), and

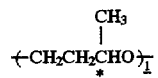

($\underline{1}$ = an integer of 1–10).

The above mesomorphic compound represented by the formula (2) may be synthesized through an intermediate which in turn can be synthesized by bonding a terminal flexible group and a mesogen group and further bonding thereto a spacer flexible chain. The spacer flexible chain at this stage is required to have an unreacted unsaturation, with which a siloxane compound is condensed in the presence of chloroplatinic acid to obtain the mesomorphic compound represented by the formula (2).

Specific examples of the mesomorphic compound may include those shown in the following Table 1 with reference to their n, $R_1$ and $R_2$, while they are not exhaustive.

TABLE 1

(* denotes the location of an asymmetric carbon atom.)

The mesomorphic compound represented by the above formula (2) has mesogen groups connected with a dimethylsiloxane unit and is therefore excellent in high speed responsive characteristic. The high speed responsive characteristic is further improved by incorporating a longer dimethylsiloxane unit, but too long a dimethylsiloxane unit degrades the mesomorphism to provide a narrower liquid crystal temperature region. For this reason, n in the formula (2) may preferably be 1–10, further preferably be 1–5 in view of enlargement of SmC* phase range and a high speed responsive characteristic.

The mesomorphic compound of the present invention may be mixed with another mesomorphic compound or liquid crystal composition to easily provide an enlarged SmC* phase temperature range. Further, the resultant liquid crystal composition is free from response speed and shows an excellent characteristic.

In such a liquid crystal composition, the mesomorphic compound of the formula (2) may preferably be contained in a proportion of 1–90 wt. %.

Further, the mesomorphic compound of the formula (2) has an optically active group, so that even if it is mixed with another optically inactive mesomorphic compound, a liquid crystal composition having an enlarged SmC* temperature range and an improved response speed can be provided.

Suitable examples of such another mesomorphic compound may include those enumerated above for the mesomorphic monomer 21.

As described hereinabove, according to the present invention, smectic molecular layers in chiral smectic phase are linked by a covalent bond, so that the control of alignment and bistability has become possible. As a result, it has become possible to provide a surface stabilized ferroelectric liquid crystal device with little constraint on the cell thickness, and a uniform alignment free of twist or distortion is realized to provide a high quality display.

Further, the present invention provides a novel mesomorphic compound represented by the above formula (2) and also a composition containing the mesomorphic compound, which shows SmC* in a wide temperature range and is excellent in high speed responsive characteristic.

Hereinbelow, the present invention will be explained more specifically with reference to examples.

EXAMPLE 1

1 wt. part of 1,1,3,3-tetramethyl-1,3-di-4'-[4"-octyloxyphenyloxycarbonyl]phenyloxyundecanyldisiloxane was added to 9 wt. parts of (+)-4-decyloxybenzoic acid-4'-(2"-fluorooctyloxy)phenylester to obtain a liquid crystal composition, which showed the following phase transition characteristic:

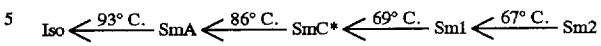

The liquid crystal composition was hermetically sealed up in a 15 micron-thick cell with rubbed polyimide films and was cooled while being supplied with an AC voltage of about ±80 volts, whereby a uniform alignment of SmC* phase with a memory characteristic was obtained over the whole area. The cell showed a good response time of 50 μsec at 75° C. in an electric field of 7 V/μm.

EXAMPLE 2

1 wt. part of (+)-1,1,3-3-tetramethyl-1,3-di-4'-[4"-(2'"-fluorooctyloxy)phenyloxycarbonyl]phenyloxyundecanyldisiloxane was added to 9 wt. parts of (+)-4-decyloxybenzoic acid-4'-(2"-fluorooctyloxy)phenylester to obtain a liquid crystal composition showing the following phase transition characteristic.

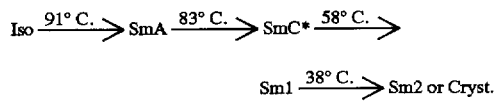

The liquid crystal composition was hermetically sealed up in a 17 micron-thick cell with rubbed polyimide films and was cooled under application of a 5 Hz AC electric field of ±50 volts, whereby a good alignment free from distortion of Sm molecular layers was obtained at a good monodomain formation characteristic. The cell showed a response time of 40 μsec (8 V/μm) at 60° C.

EXAMPLE 3

1 wt. % of a mesomorphic dimer of the formula (4) shown below was mixed with 12 wt. parts of an SmC* liquid crystal compound of the formula (5) below to obtain a liquid crystal composition showing a phase transition characteristic:

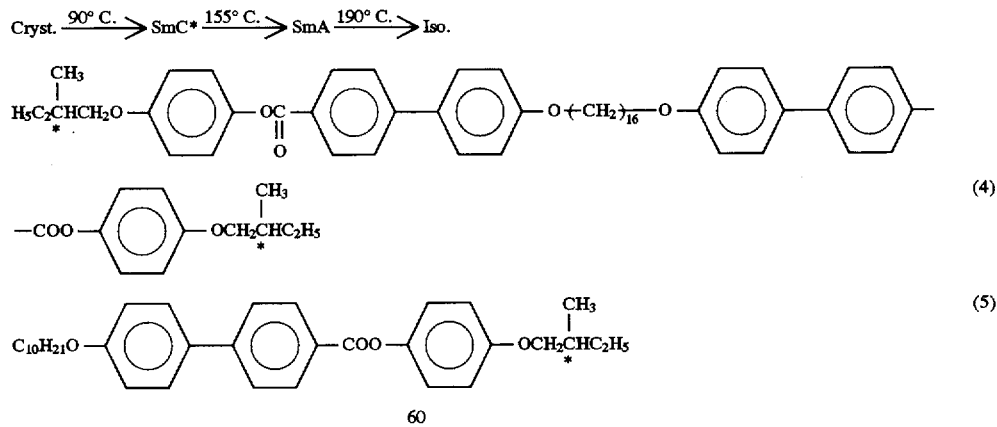

The composition was sealed up in a 10 micron-thick cell with rubbed polyimide films and was gradually cooled from 190° C. to 120° C. under application of an AC electric field of about ±80 V to form a uniform alignment in SmC* phase over the entire area. Thus, a uniform alignment with a memory characteristic was obtained and showed a contrast of 4:1. A good electric field response time of 300 μsec (10 V/μm) was obtained at 130° C.

EXAMPLE 4

1 wt. part of a main chain-type mesomorphic polymer of the following formula (6) (n≈10) was mixed with 10 wt. part of a chiral smectic liquid crystal compound of the following formula (7), and the mixture was dissolved in a 1:1 mixture solvent of decalin and toluene heated at 100° C.

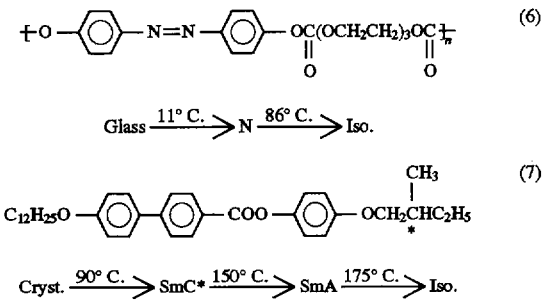

The solution was rapidly cooled to form a gel, which was then passed between a pair of opposite pressing rollers to be rolled into a sheet. The sheet was placed on 50 micron-thick PVA (polyvinyl alcohol) film, dried under vacuum at room temperature and then covered with an additional PVA film. The resultant laminate was passed between rollers to be press-bonded and rolled to provide an about 50 micron-thick layer of the liquid crystal composition. The resultant laminate was passed at 100° C. between two pairs of rollers rotating at different circumferential speeds to be uniaxially stretched at a stretching ratio of 110%. The liquid crystal composition layer in the resultant laminate had a thickness of 10 microns and was provided with a monodomain of uniform alignment. The laminate was sandwiched between glass substrates with ITO coatings and subjected to an electric field whereby a memory state was obtained at a response time of 800 μsec (20 V/μm) at 110° C.

EXAMPLE 5

(+)-1,1,3,3-tetramethyl-1,3-di-4'-[4"-(2'"-fluorooctyloxy) phenyloxycarbonyl]phenyloxyundecanyl=disiloxane was synthesized through the following steps (1)–(5).

(1) Synthesis of 10-undecenyl p-toluenesulfonate 4.32 g (54.0 mM) of dry pyridine was added to 3.40 g (20.0 mM) of 10-undecene-1-ol, followed by stirring for 10 minutes at 0° C. Into the solution was added 3.80 g (20.0 mM) of p-toluenesulfonyl chloride, followed by stirring for 4 hours at room temperature. After the reaction, 2M-hydrochloric acid was added to acidify the reaction liquid, followed by extraction with ether. Into the extract liquid was added anhydrous sodium sulfate, followed by drying and distilling-off of the ether to obtain 6.20 g (19.1 mM) of 10-undecenyl p-toluenesulfonate. Yield: 95.5%.

(2) Synthesis of ethyl p-(10-undecenyl)oxybenzoate 6 ml of dimethylformamide was added to 6.20 g (19.1 mM) of 10-undecenyl p-toluenesulfonate and 3.17 g (19.1 mM) of ethyl p-hydroxybenzoate, followed by sufficient stirring. Into the resultant solution was added 0.77 g (19.3 mM) of sodium hydride (60%), followed by heat-refluxing for 7 hours. After the reaction, dimethylformamide was distilled off, followed by addition of water and extraction with ether. To the ether extract liquid was added anhydrous sodium sulfate for drying, followed by distilling-off of the ether and separation-purification by column chromatography (developer solvent: methylene chloride) to obtain 5.80 g (18.2 mM) of ethyl p-(10-undecenyl)oxybenzoate. Yield: 91.2%.

(3) Synthesis of p-(10-undecenyl)oxybenzoic acid

A solution of 5.80 g (18.2 mM) of ethyl p-(10-undecenyl) oxybenzoate and 2.18 mg (54.6 mM) of sodium hydroxide in 4 ml of water, and 30 ml of methanol were stirred for 3 hours under heating. After the reaction, 20 ml of distilled water was added, followed by distilling-off of methanol and acidification of the solution with 6M-hydrochloric acid. The thus-produced p-(10-undecenyl)oxybenzoic acid was recovered by filtration and dried under vacuum in a dessicator to obtain 5.25 g (18.1 mM) of p-(10-undecenyl)oxybenzoic acid. Yield: 99.5% %.

(4) Synthesis of (−)-p'-(2-fluorooctyloxy)phenyl p-(10-undecenyl)oxybenzoate 1.13 g of p-(10-undecenyl)oxybenzoic acid was heat-refluxed for 3 hours together with 8 ml of thionyl chloride, followed by distilling-off of unreacted thionyl chloride to obtain an acid chloride.

Then, into a solution of 0.87 g (7.80 mM) of triethylene-diamine in 5 ml of dry benzene, 0.94 g (3.9 mM) of (+)-p-(2-fluorooctyloxy)phenol ([α]$_D^{27}$+3.92 degrees (C2, CH$_2$Cl$_2$)) was added, and the resultant mixture was added dropwise to the above acid chloride, followed by 2 hours of heating at 50° C. Then, 0.19 g (4.70 mM) of sodium hydroxide (60%) was added together with dry benzene, followed by further 2 hours of heat refluxing. After the completion of the reaction, the solution was acidified by the addition of 2M-hydrochloric acid and extracted with benzene.

To the extract liquid was added anhydrous sodium sulfate for drying, followed by distilling-off of benzene, purification by column chromatography (developer solvent: benzene) and recrystallization from 4 ml of hexane to obtain 1.35 g (2.64 mM) of (−)-p'-(2-fluorooctyloxy)phenyl p-(10-undecenyl)oxybenzoate. Yield: 67.6%, [α]$_D^{27}$−3.40 degrees (c1, benzene)

(5) Synthesis of (+)-1,1,3,3-tetramethyl-1,3-di-4'-[4"-(2'"-fluorooctyloxy)phenyloxycarbonyl]phenyloxyundecanyl=disiloxane 0.256 g (0.5 mM) of (−)-p'-(2-fluorooctyloxy)phenyl p-(10-undecenyl)oxybenzoate and 0.5 ml of dry toluene were mixed, and under the stirring of the mixture, 3 mg (about 0.002 mM) of 1M-chloroplatinic acid solution in isopropanol. After about 3 minutes of stirring, 0.067 g (0.5 mM) of 1,1,3,3-tetramethyldisiloxane was added, followed by 7 hours of stirring at 100° C. Further, 0.080 g (0.16 mM) of (−)-p'-(2-fluorooctyloxy)phenyl p-(10-undecenyl) oxybenzoate was added, followed by 4 hours of heating at 100° C.

After the reaction, the product was purified by column chromatography (developer solvent: mixture of methylene chloride/hexane=1/1) and recrystallized from 5 ml of hexane to obtain 0.272 mg (0.23 mM) of (+)-1,1,3,3-tetramethyl-1,3-di-4'-[4"-(2'"-fluorooctyloxy)phenyloxycarbonyl] phenyloxyundecanyl=disiloxane. Yield: 70.7%, [α]$_D^{28}$+1.40 degree (c 0.86, CH$_2$Cl$_2$)

Phase transition temperature

Iso. $\xleftarrow{105° C.}$ SmC* $\xleftarrow{61° C.}$ Cryst.

EXAMPLE 6

(+)-1,1,3,3-tetramethyl-1,3-di-4'-[4"-(2'"-fluorooctyloxy) phenyloxycarbonyl]phenyloxyundecanyl=disiloxane prepared in Example 5 was sealed up in a 17 micron-thick cell with rubbed polyimide films and subjected to measurement of a response time at 70° C., whereby the value of 200 μsec was obtained at 8 V/pm.

EXAMPLE 7

1 wt. part of (+)-1,1,3,3-tetramethyl-1,3,-di-4'-[4"-(2'"-fluorooctyloxy)phenyloxycarbonyl]phenyloxyundecanyl= disiloxane was mixed with 9 wt. parts of (+)-4'-(2"-fluorooctyloxy)phenyl 4-decyloxybenzoate to obtain a liquid crystal composition, which showed SmC* phase in the range of 83°–58° C.

EXAMPLE 8

(+)-1,1,3,3-tetramethyl-1,3-di-4'-[4"-(2'"-fluorooctyloxy) phenylcarbonyloxy]phenyloxyundecanyl=disiloxane of the following formula was prepared through the steps (1)–(3) below:

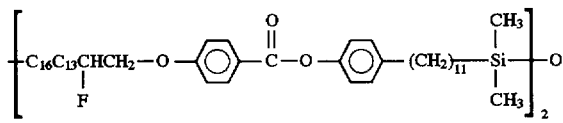

(1) Synthesis of p-(10-undecenyl)oxyphenol 2.60 g (8.02 mM) of 10-undecenyl p-toluenesulfonate and 1.79 g (16.2 mM) of hydroquinone were well mixed with 3 ml of butanol under stirring. Into the solution, a solution of 0.419 (9.74 mM) of sodium amalgam dissolved in 6 ml of butanol, followed by 7 hours of heat-refluxing at 110° C. After the reaction, butanol was distilled off, followed by addition of water and extraction with ether. To the ether extract liquid was added anhydrous sodium sulfate for drying, followed by distilling-off of ether and purification by column chromatography (developer solvent: methylene chloride) to obtain 1.00 g (3.82 mM) of p-(10-undecenyl) oxyphenol. Yield: 47.6%.

(2) Synthesis of (−)-p'-(10-undecenyloxy)phenyl p-(2-fluorooctyloxybenzoate)

0.54 g (2.0 mM) of (+)-(2-fluorooctyloxy)benzoic acid was heat-refluxed for 1.5 hours together with 3 ml of thionyl chloride, followed by distilling off of unreacted thionyl chloride to obtain an acid chloride.

Then, to a solution of 0.45 g (4.0 mM) of triethylenediamine in 3 ml of dry benzene, 0.52 g (2.0 mM) of p-(10-undecenyloxy)phenol was added, and the mixture was added to the above acid chloride dropwise under stirring, followed by 2 hours of heating at 50° C. To the reaction mixture was added 0.08 g (2.0 mM) of sodium hydroxide (60%), together with dry benzene, followed by 2 hours of heat refluxing. After the reaction, the solution was acidified with 2M-hydrochloric acid and extracted with benzene. The extract liquid was dried by addition of anhydrous sodium sulfate, followed by distilling-off of benzene, separation-purification by column chromatography (developer solvent: benzene) and recrystallization from 2 ml of hexane to obtain 0.65 mg (1.27 mM) of (−)-p'-(10-undecenyloxy)phenyl p-(2-fluorooctyloxy)benzoate. yield: 63.5%, [α]$_D^{26}$–4.27 degrees (c 1.03, benzene).

(3) Synthesis of (+)-1,1,3,3-tetramethyl-1,3-di-4'-[4"-(2'"-fluorooctyloxy)phenylcarbonyloxy]phenyloxyundecanyl= disiloxane 0.256 g (0.5 mM) of (−)-p'-(10-undecenyloxy)phenyl p-(2-fluorooctyloxy)benzoate and 0.5 ml of dry toluene were mixed, followed by addition of 3 mg (about 0.002 mM) of a 1M-chloroplatinic acid solution in isopropanol under stirring. After about 3 minutes of stirring, 0.067 g (0.5 mM) of -1,1,3,3-tetramethyldisiloxane was added, followed by 7 hours of heating at 100° C. Further, 0.080 g (0.16 mM) of (−)-p'-(10-undecenyloxy)phenyl p-(2-fluorooctyloxy) benzoate was added, and the mixture was heated for 4 hours at 100° C.

After the reaction, the product was purified by column chromatography (developer solvent: methylene chloride/hexane=1/1) and recrystallized from 3 ml of hexane to obtain 0.230 g (0.2 mM) of (+)-1,1,3,3-tetramethyl-1,3-di-4'-[4"-(2'"-fluorooctyloxy)phenylcarbonyloxy] phenyloxyundecanyl=disiloxane. Yield: 60.2 [α]$_D^{26}$+2.21 degrees (c1, CH$_2$Cl$_2$).

EXAMPLE 9

1,1,3,3-tetramethyl-1,3-di-4'-(4"-(3'"-trifluoromethylheptyloxy)phenyloxycarbonyl] phenyloxyundecanyl=disiloxane of the following formula was obtained through the following steps (1) and (2):

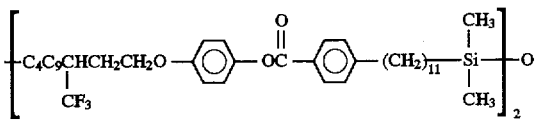

(1) Synthesis of p'-(3-trifluoromethylheptyloxy)phenyl p-(10-undecenyl)oxybenzoate 0.44 g (1.5 mM) of p-(10-undecenyl)oxybenzoic acid was heat-refluxed for 2 hours together with 2 ml of thionyl chloride, and then unreacted thionyl chloride was distilled off to obtain an acid chloride.

On the other hand, a solution of 0.34 g (3.0 mM) of triethylenediamine in 3 ml of dry benzene was added to 0.41 g (1.5 mM) of p-(3- trifluoromethylheptyloxy)phenol, followed by cooling on ice under stirring. To this solution was added dropwise a solution of the above-prepared acid chloride in benzene. After the addition, the mixture was stirred for 2 hours at 50° C., and 40 mg of sodium hydride (60 was added together with dry benzene thereto, followed further by 2 hours of heat-refluxing. After the reaction, the reaction mixture was acidified with 2M-hydrochloric acid and extracted with ether. The extract liquid was dried with the addition of anhydrous sodium sulfate, followed by distilling-off of the solvent and purification by column chromatography (developer solvent: benzene) to obtain 0.38 g (0.7 mM) of p'-(3- trifluoromethylheptyloxy)phenyl p-(10-undecenyl) oxybenzoate. Yield: 46%.

(2) Synthesis of 1,1,3,3-tetramethyl-1,3-di-4'-[4"-(3'"-trifluoromethylheptyloxy)phenyloxycarbonyl] phenyloxyundecanyl=disiloxane 0.100 g (0.18 mM) of p'-(3-trifluoromethylheptyloxy) phenyl p-(10-undecenyl)oxybenzoate and 0.2 ml of dry toluene were mixed, and 3 mg (about 0.002 mM) of a 1M-solution of chloroplatinic acid in isopropanol was added under stirring. After about 3 minutes of stirring, 0.024 g (0.18 mM) of 1,1,3,3-tetramethyldisiloxane was added, and the mixture was heated for 7 hours at 100° C. Then, 0.020 g (0.036 mM) of p'-(3-trifluoromethylheptyloxy)phenyl p-(10-undecenyl)oxybenzoate was added, followed by 5 hours of heating at 100° C.

After the reaction, the product was purified by column chromatography (developer solvent: methylene chloride/hexane=1/1) to obtain 0.080 g (0.065 mM) of 1,1,3,3-tetramethyl-1,3-di-4'-[4"-(3'"-trifluoromethylheptyloxy) phenyloxycarbonyl]phenyloxyundecanyl=disiloxane. Yield: 72.3%.

What is claimed is:

1. A smectic liquid crystal composition, comprising a main chain-type mesomorphic polymer having at least two mesogen groups and a spacer flexible chain group connecting the mesogen groups, wherein said main chain-type mesomorphic polymer has a structure represented by the following formula (1):

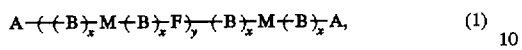  (1)

wherein A denotes a terminal flexible chain group, said terminal flexible chain group comprising at least one of

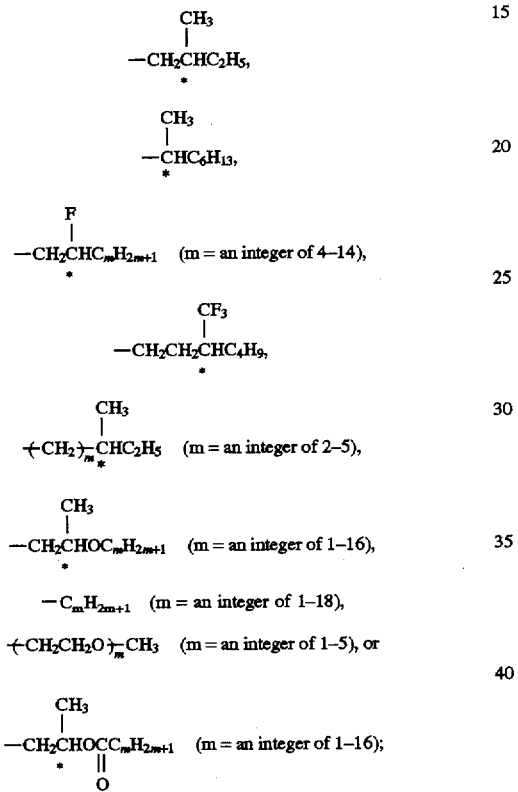

M denotes a mesogen group said mesogen group comprising at least one of

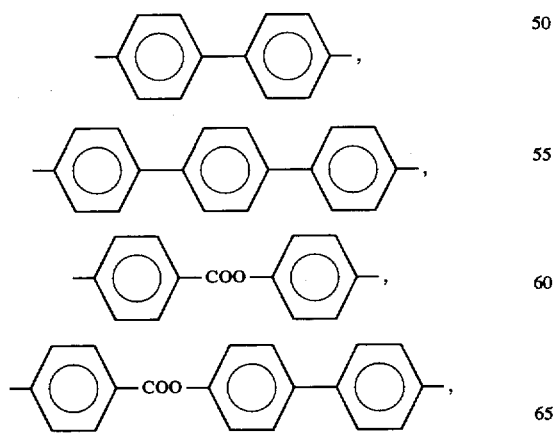

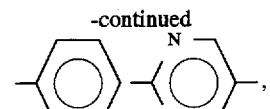

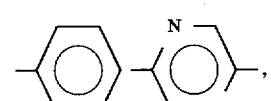

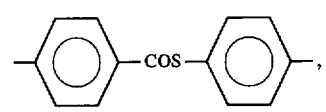

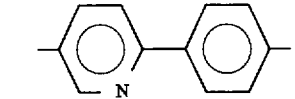

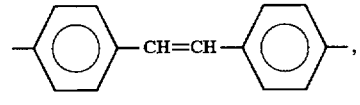

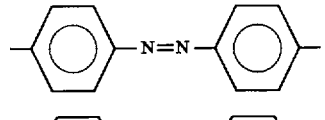

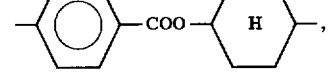

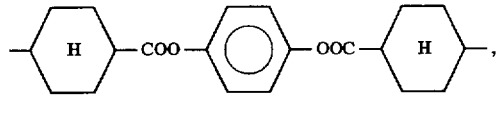

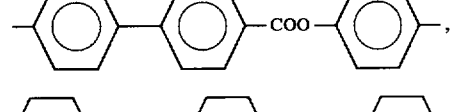

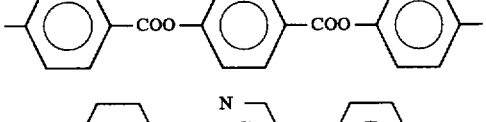

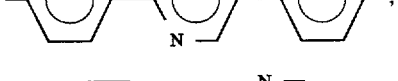

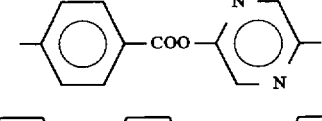

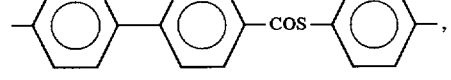

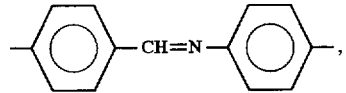

-continued

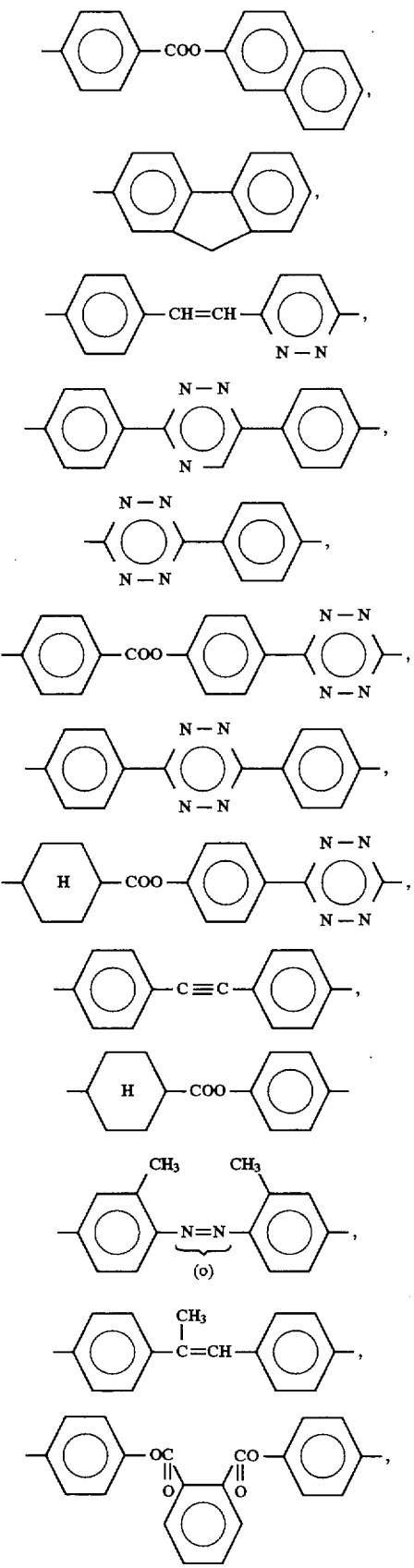

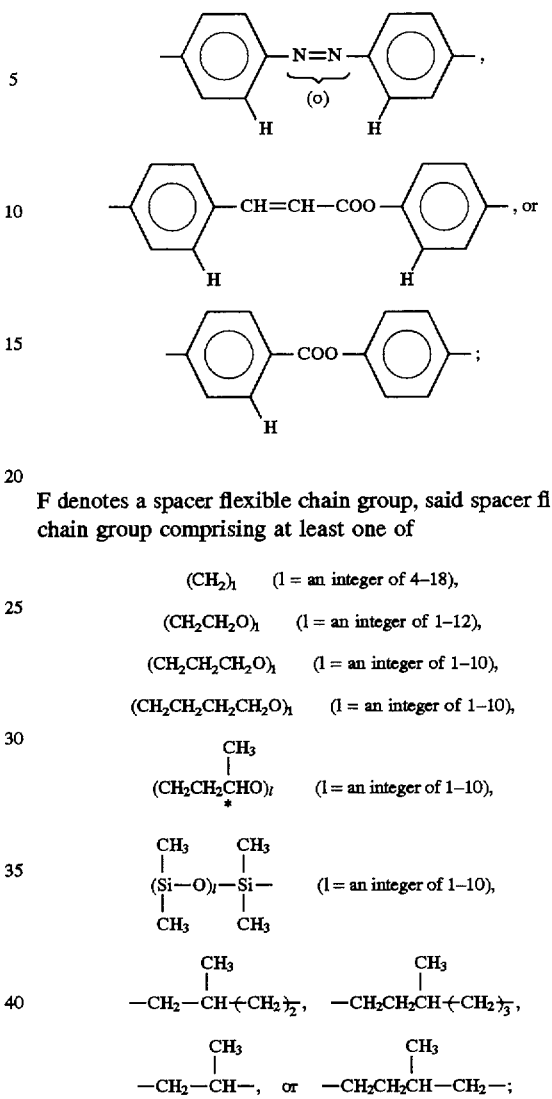

F denotes a spacer flexible chain group, said spacer flexible chain group comprising at least one of $(CH_2)_l$    (l = an integer of 4–18), $(CH_2CH_2O)_l$    (l = an integer of 1–12), $(CH_2CH_2CH_2O)_l$    (l = an integer of 1–10), $(CH_2CH_2CH_2CH_2O)_l$    (l = an integer of 1–10), $(CH_2CH_2\overset{*}{C}H(CH_3)O)_l$    (l = an integer of 1–10), $(Si(CH_3)_2-O)_l-Si(CH_3)_2-$    (l = an integer of 1–10), $-CH_2-CH(CH_3)(CH_2)_2-$,    $-CH_2CH_2CH(CH_3)(CH_2)_3-$, $-CH_2-CH(CH_3)-$, or    $-CH_2CH_2CH(CH_3)-CH_2-$;

X is 0 or 1; B denotes an ester bond group, ether bond group, thioester bond group, dimethylsiloxane bond group or thioether bond group; and y is 1–200; and a mesomorphic monomer, said composition showing a smectic phase wherein the main chain-type mesomorphic polymer and the mesomorphic monomer are mutually dissolved and aligned to provide a plurality of molecular layers each including a plurality of liquid crystal molecules, and wherein the spacer flexible chain group is present between adjacent smectic molecular layers among the plurality of smectic molecular layers, thereby linking said adjacent smectic molecular layers.

2. A liquid crystal device, comprising a pair of substrates and an aligned layer of smectic liquid crystal composition disposed between the substrates; said smectic liquid crystal composition comprising a main chain-type mesomorphic polymer having at least two mesogen groups and a spacer flexible chain group connecting the mesogen groups, wherein said main chain-type mesomorphic polymer has a structure represented by the following formula (1):

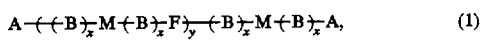
(1)
wherein A denotes a terminal flexible chain group, comprising at least one of
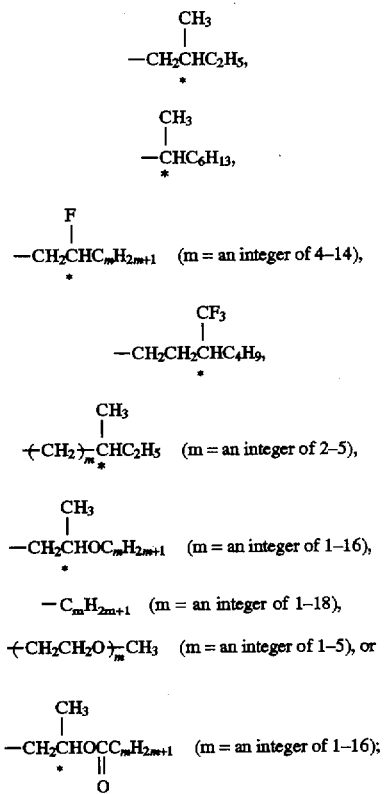
M denotes a mesogen group, said mesogen group comprising at least one of
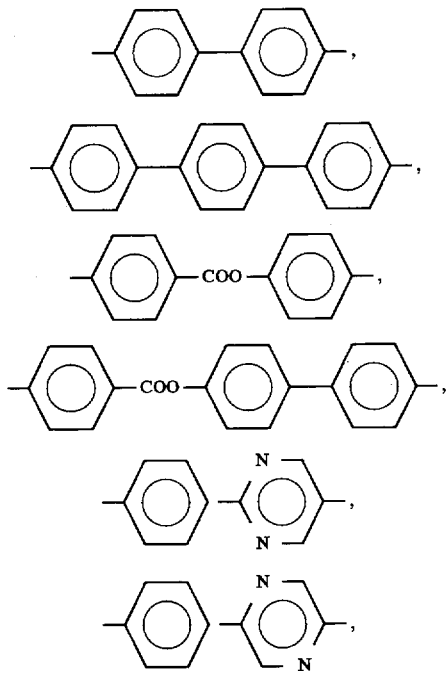
-continued
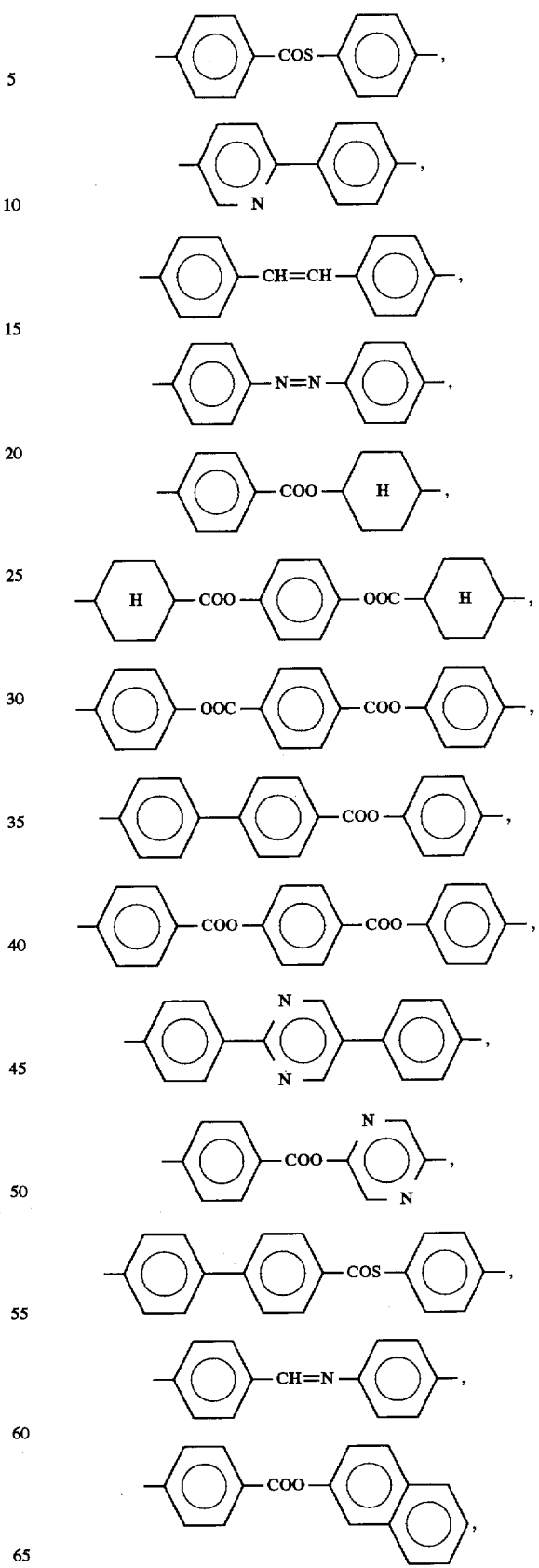

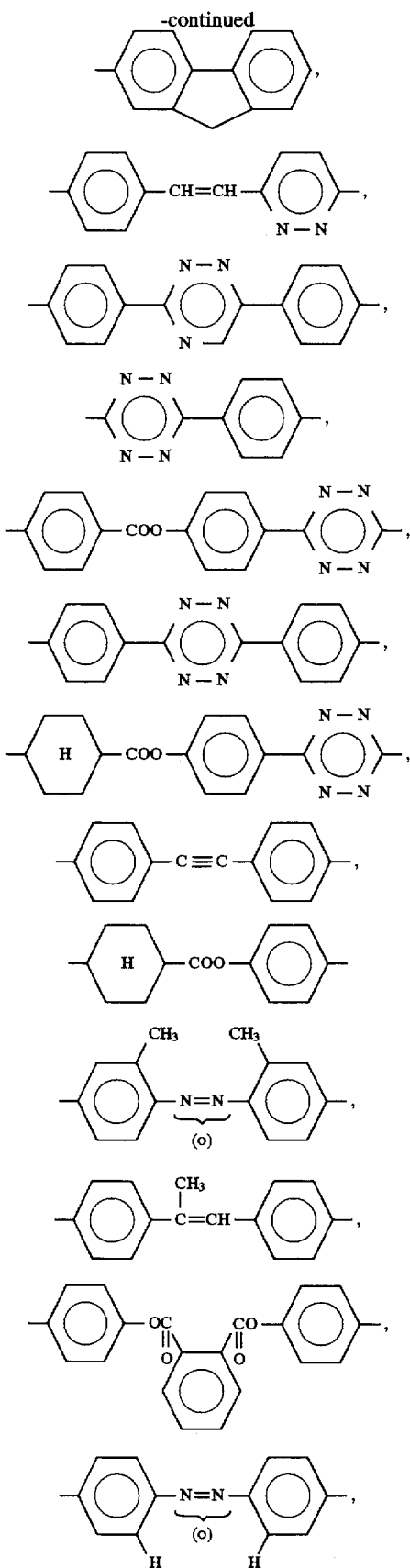

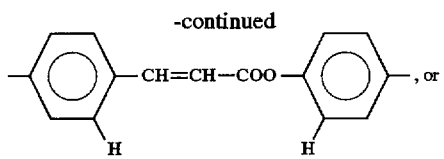

F denotes a spacer flexible chain group comprising at least one of $(CH_2)_l$    (l = an integer of 4–18), $(CH_2CH_2O)_l$    (l = an integer of 1–12), $(CH_2CH_2CH_2O)_l$    (l = an integer of 1–10), $(CH_2CH_2CH_2CH_2O)_l$    (l = an integer of 1–10), $(CH_2CH_2\overset{*}{\underset{\displaystyle CH_3}{C}}HO)_l$    (l = an integer of 1–10), $(\underset{\displaystyle CH_3}{\overset{\displaystyle CH_3}{Si}}-O)_l-\underset{\displaystyle CH_3}{\overset{\displaystyle CH_3}{Si}}-$    (l = an integer of 1–10), $-CH_2-\overset{\displaystyle CH_3}{CH}-(CH_2)_{\overline{2}},$    $-CH_2CH_2\overset{\displaystyle CH_3}{CH}-(CH_2)_{\overline{3}},$ $-CH_2-\overset{\displaystyle CH_3}{CH}-,$    or    $-CH_2CH_2\overset{\displaystyle CH_3}{CH}-CH_2-;$ x is 0 or 1; B denotes an ester bond group, ether bond group, thioester bond group, dimethylsiloxane bond group or thioether bond group: and y is 1–200; and a mesomorphic monomer, said composition showing a smectic phase wherein the main chain-type mesomorphic polymer and the mesomorphic monomer are mutually dissolved and aligned to provide a plurality of smectic molecular layers each including a plurality of liquid crystal molecules, and wherein the spacer flexible chain group is present between adjacent smectic molecular layers among the plurality of smectic molecular layers, thereby linking said adjacent smectic molecular layers.

3. A device according to claim 2, wherein the aligned layer of said smectic liquid crystal composition has been stretched for alignment control.

4. A device according to claim 2, wherein said main chain-type mesomorphic polymer has three or more mesogen groups.

5. A device according to claim 4, wherein the aligned layer of said smectic liquid crystal composition has been stretched for alignment control.

6. A device according to claim 2, wherein said main chain-type mesomorphic polymer is a mesomorphic dimer.

7. A device according to claim 2, wherein said smectic liquid crystal composition is a chiral smectic liquid crystal composition.

8. A composition according to claim 1, wherein the smectic liquid crystal composition has been stretched for alignment control.

9. A composition according to claim 1, wherein said main chain-type mesomorphic polymer has three or more mesogen groups.

10. A composition according to claim 9, wherein the smectic liquid crystal composition has been stretched for alignment control.

11. A composition according to claim 1, wherein said main chain-type mesomorphic polymer is a mesomorphic dimer.

12. A device according to claim 2, wherein at least one of the substrate has an alignment film thereon.

13. A device according to claim 12, wherein the alignment film has been rubbed.

14. A process for producing a liquid crystal device including a layer of a smectic liquid crystal disposed between a pair of substrates, comprising:

providing a cell including a pair of substrates, at least one of which has been subjected to a uniaxial orientation treatment;

selecting a liquid crystal composition comprising a main chain-type mesomorphic polymer comprising two mesogen groups and a spacer flexible chain group connecting the mesogen groups, and a mesomorphic monomer, wherein said liquid crystal composition successively exhibits isotropic phase and a smectic phase on temperature decrease;

sealing said liquid crystal composition in its isotropic phase in said cell;

cooling the cell to place said liquid crystal composition in a smectic phase so as to form smectic molecular layers disposed vertically or inclined with respect to the substrates in which the main chain-type mesomorphic polymer and the mesomorphic monomer are mutually dissolved and aligned to provide a plurality of molecular layers each including a plurality of liquid crystal molecules, wherein the spacer flexible chain group is present between adjacent smectic molecular layers among the plurality of smectic molecular layers, thereby linking said adjacent smectic molecular layers.

15. A process according to claim 14, wherein said main chain-type mesomorphic polymer has at least three recurring units.

16. A process according to claim 14, wherein said main chain-type mesomorphic polymer is a mesomorphic dimer.

17. A process according to claim 14, wherein said uniaxial orientation treatment comprises rubbing.

18. A liquid crystal device, comprising:

a pair of substrates, at least one of which has been subjected to a uniaxial orientation treatment; and a layer of a smectic liquid crystal disposed between the substrates;

said smectic liquid crystal comprising a liquid crystal composition comprising a main chain-type mesomorphic polymer having at least two mesogen groups and a spacer flexible chain group connecting the mesogen groups, and a mesomorphic monomer, said liquid crystal composition successively exhibiting isotropic phase and a smectic phase on temperature decrease and being disposed between the substrates in a smectic phase in which the main chain-type mesomorphic polymer and the mesomorphic monomer are mutually dissolved and aligned so as to form a plurality of smectic molecular layers disposed vertically or inclined with respect to the substrates, each of the smectic molecular layers including a plurality of liquid crystal molecules, wherein the spacer flexible chain group is present between adjacent smectic molecular layers among the plurality of smectic molecular layers, thereby linking said adjacent smectic molecular layers.

19. A device according to claim 18, wherein said main chain-type mesomorphic polymer has at least three recurring units.

20. A device according to claim 18, wherein said main chain-type mesomorphic polymer is a mesomorphic dimer.

21. A device according to claim 18, wherein said uniaxial orientation treatment comprises rubbing.

\* \* \* \* \*

UNITED STATES PATENT AND TRADEMARK OFFICE
CERTIFICATE OF CORRECTION

PATENT NO. : 5,720,898

DATED : February 24, 1998

INVENTOR(S): HIROYUKI NOHIRA ET AL.

Page 1 of 2

It is certified that error appears in the above-identified patent and that said Letters Patent is hereby corrected as shown below:

On the title page: Item

[30] FOREIGN APPLICATION PRIORITY DATA

"62-321581" should read --62-320581--.

COLUMN 1

Line 62, "with a" should be deleted.

COLUMN 22

Line 19, "SmC*." should read --SmC*. ¶ Mesomorphic monomer 21 showing non-chiral smectic phase.--.

COLUMN 34

Line 37, "benzene)" should read --benzene).--.

COLUMN 36

Line 39, "(60" should read --(60%)--.

UNITED STATES PATENT AND TRADEMARK OFFICE
CERTIFICATE OF CORRECTION

PATENT NO. : 5,720,898

DATED : February 24, 1998

INVENTOR(S) : HIROYUKI NOHIRA ET AL.

It is certified that error appears in the above-identified patent and that said Letters Patent is hereby corrected as shown below:

COLUMN 37

Line 9, "A-(-(B)$_x$-M-(B)$_x$-F)$_y$-(B)$_x$-M-(B)$_x$-A," should read

--A-(-(B)$_x$-M-(B)$_x$-F)$_y$-(B)$_x$-F-(B)$_x$-M-(B)$_x$-A--.

COLUMN 41

Line 2, "A-(-(B)$_x$-M-(B)$_x$-F)$_y$-(B)$_x$-M-(B)$_x$-A," should read

--A-(-(B)$_x$-M-(B)$_x$-F)$_y$-(B)$_x$-F-(B)$_x$-M-(B)$_x$-A--.

COLUMN 46

Line 38, Insert. --22. A composition according to claim 1, wherein said smectic phase is a chiral smectic phase.--.

Signed and Sealed this

Fifth Day of January, 1999

Attest:

Attesting Officer

*Acting Commissioner of Patents and Trademarks*